United States Patent
Chidambaran et al.

(10) Patent No.: US 8,753,509 B2
(45) Date of Patent: Jun. 17, 2014

(54) ADVANCED FILTRATION DEVICE FOR WATER AND WASTEWATER TREATMENT

(75) Inventors: Ravi Chidambaran, Canonsburg, PA (US); Pavan Raina, Pune (IN); Sugata Das, Pune (IN); Nitin Chandan, Pune (IN)

(73) Assignee: Aquatech International Corporation, Canonsburg, PA (US)

( * ) Notice: Subject to any disclaimer, the term of this patent is extended or adjusted under 35 U.S.C. 154(b) by 362 days.

(21) Appl. No.: 13/024,006

(22) Filed: Feb. 9, 2011

(65) Prior Publication Data

US 2011/0192794 A1    Aug. 11, 2011

Related U.S. Application Data

(60) Provisional application No. 61/319,339, filed on Mar. 31, 2010.

(30) Foreign Application Priority Data

Feb. 9, 2010    (IN) .............................. 275/DEL/2010

(51) Int. Cl.
  *B01D 63/08*    (2006.01)
  *B01D 29/03*    (2006.01)
  *C02F 1/00*    (2006.01)

(52) U.S. Cl.
  USPC ...................... 210/321.84; 210/496; 210/314

(58) Field of Classification Search
  None
  See application file for complete search history.

(56) References Cited

U.S. PATENT DOCUMENTS

| | | | |
|---|---|---|---|
| 3,483,867 A * | 12/1969 | Markovitz | 604/6.09 |
| 5,437,796 A | 8/1995 | Bruschke et al. | |
| 6,325,928 B1 * | 12/2001 | Pedersen et al. | 210/232 |
| 6,645,380 B2 | 11/2003 | Baig et al. | |
| 6,682,652 B2 | 1/2004 | Mahendran et al. | |
| 7,279,215 B2 | 10/2007 | Hester et al. | |
| 7,678,273 B2 | 3/2010 | Harms et al. | |
| 2005/0000881 A1 * | 1/2005 | Bruss | 210/321.61 |
| 2005/0284814 A1 * | 12/2005 | Mairal et al. | 210/644 |
| 2006/0131234 A1 * | 6/2006 | Zha et al. | 210/636 |
| 2008/0041783 A1 | 2/2008 | Barnes | |
| 2011/0005993 A1 | 1/2011 | Masutani et al. | |

FOREIGN PATENT DOCUMENTS

JP    11-179165    *    7/1999

OTHER PUBLICATIONS

International Search Report for PCT/US2011/024189 dated Apr. 6, 2011 (Form PCT/ISA/210).
Written Opinion of the International Searching Authority for PCT/US2011/024189 dated Apr. 6, 2011 (Form PCT/ISA/237).

* cited by examiner

*Primary Examiner* — Katherine Zalasky
(74) *Attorney, Agent, or Firm* — Buchanan Ingersoll & Rooney PC

(57) ABSTRACT

Embodiments of the present invention relate to a filtration module and/or a novel method of making a frameless filtration module for water or wastewater treatment that can produce filtrate that is free of particles, reduce precipitated hardness, colloids and organic compounds. The designed apparatus, which is either encapsulated or in cassette form, can be assembled and disbanded easily to suit diverse process requirements. The module configuration and assembly also helps in clean-in-place, repair or replacement activities to be performed in situ.

16 Claims, 9 Drawing Sheets

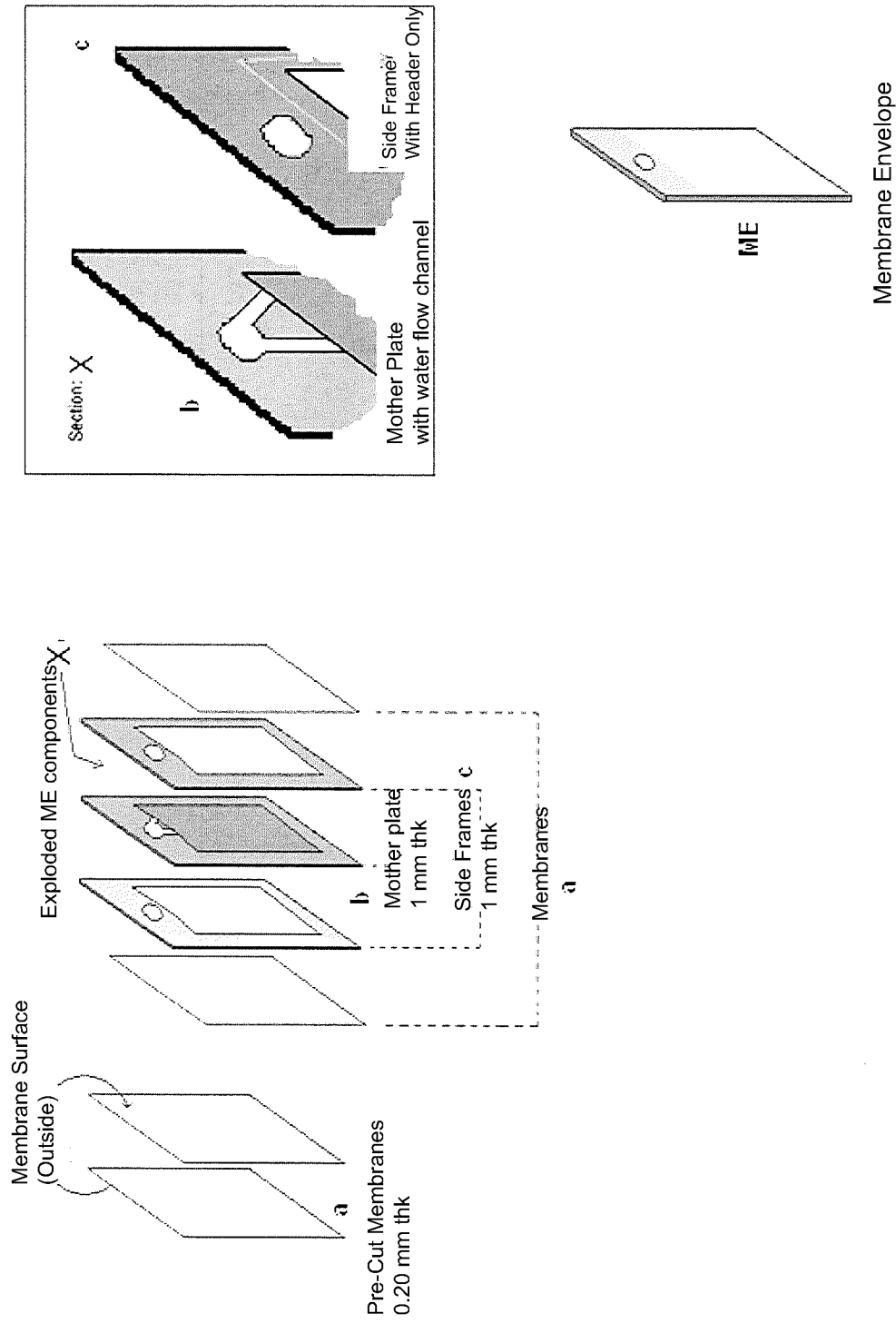
Figure: 1

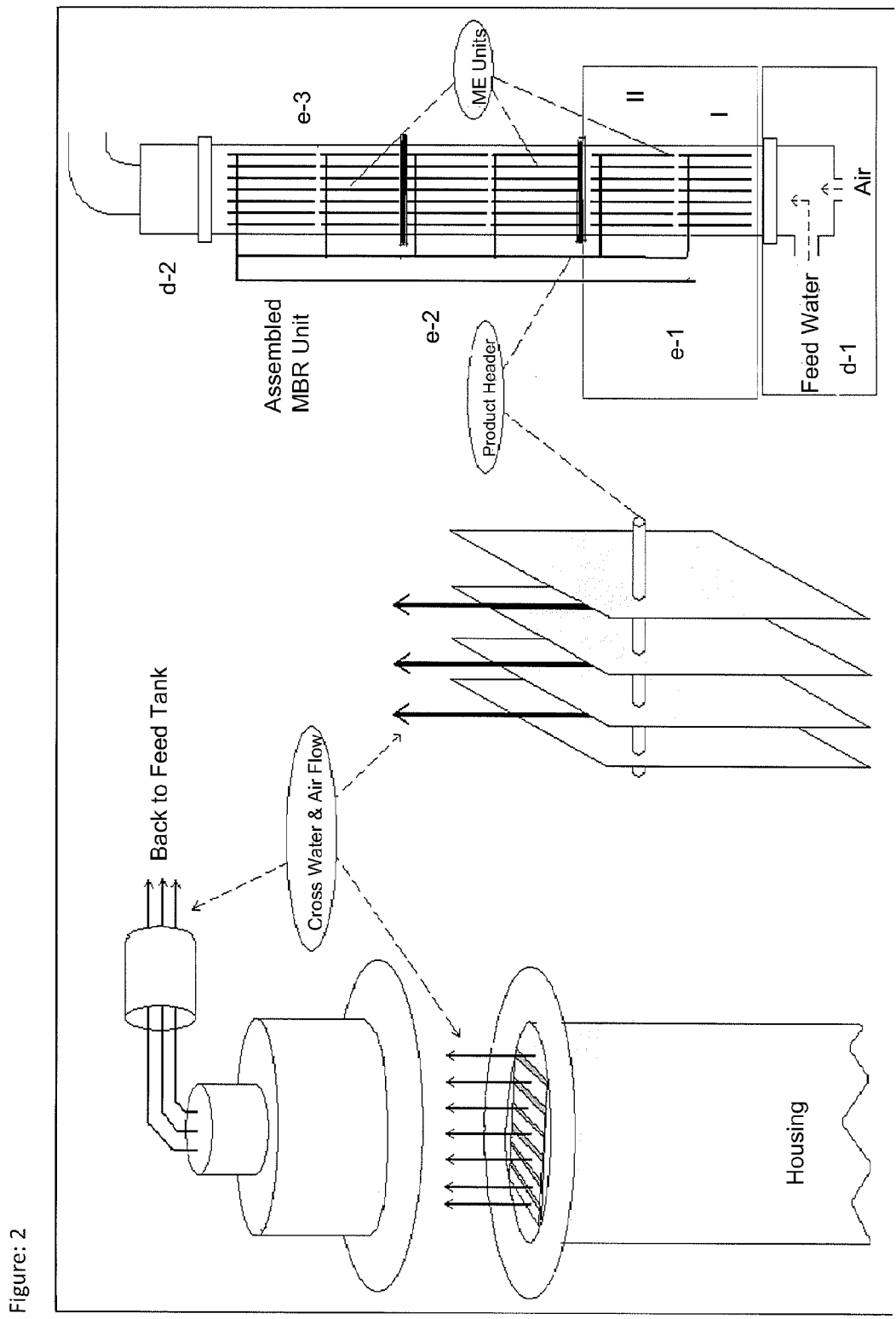
Figure: 2

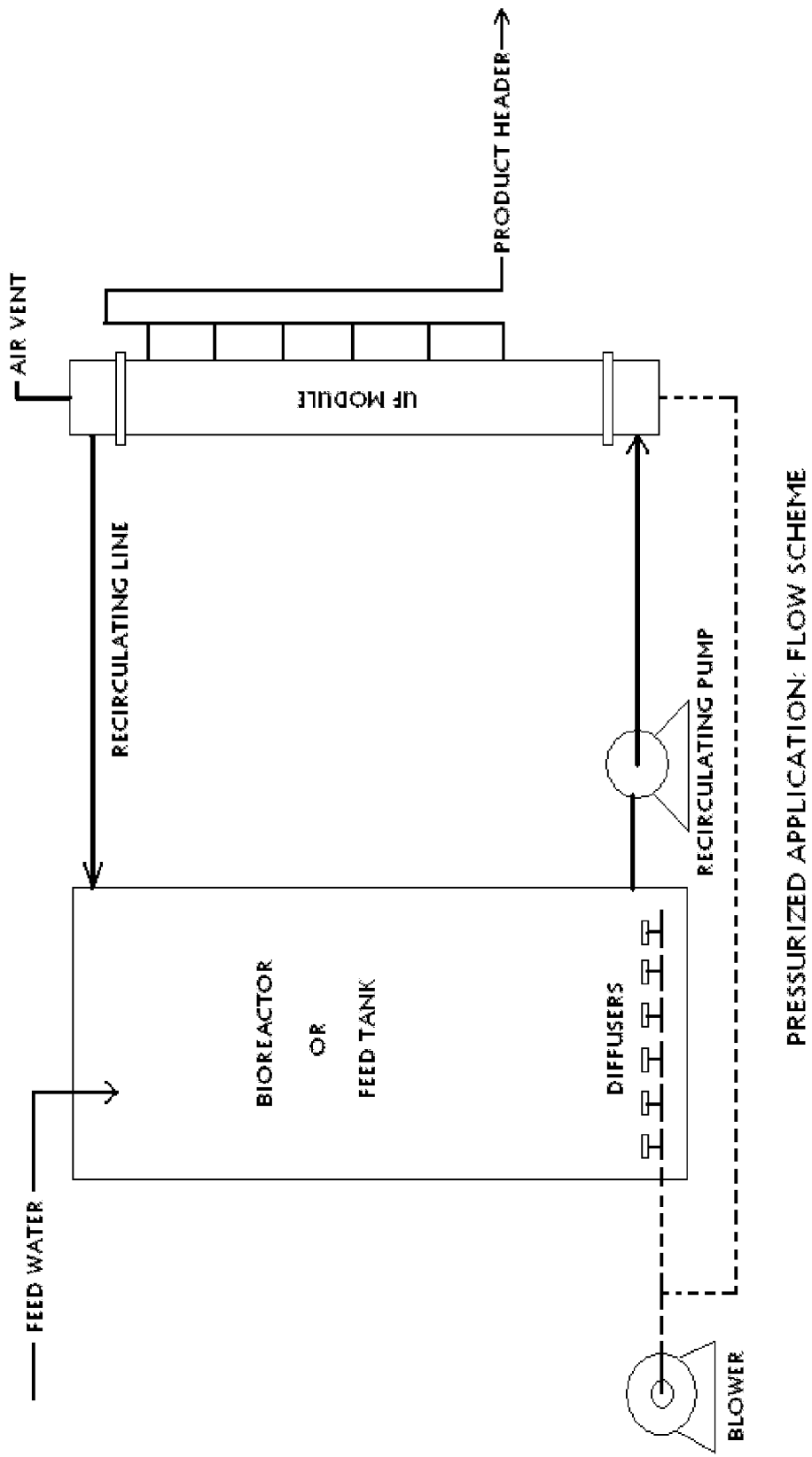
Figure: 3

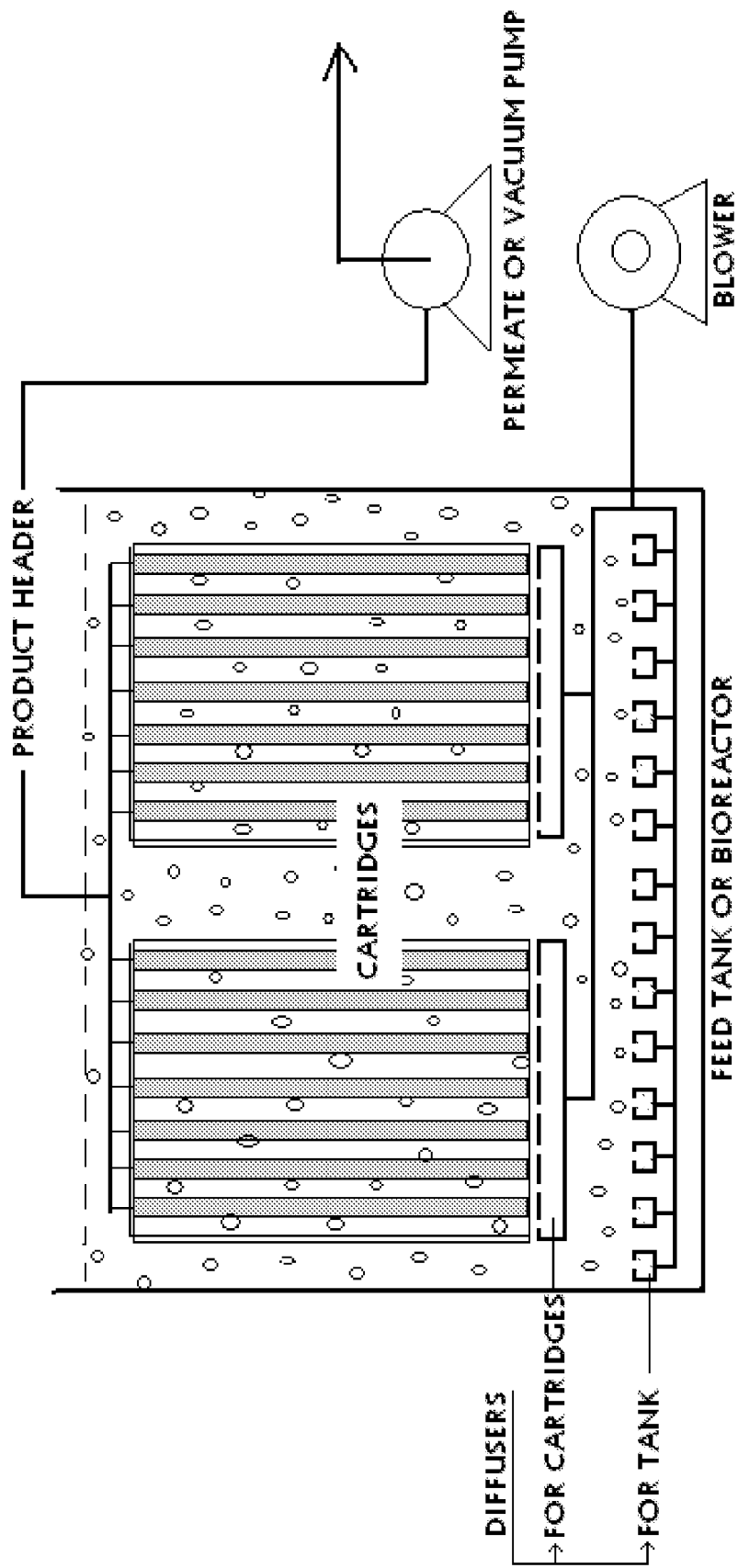
Figure: 4

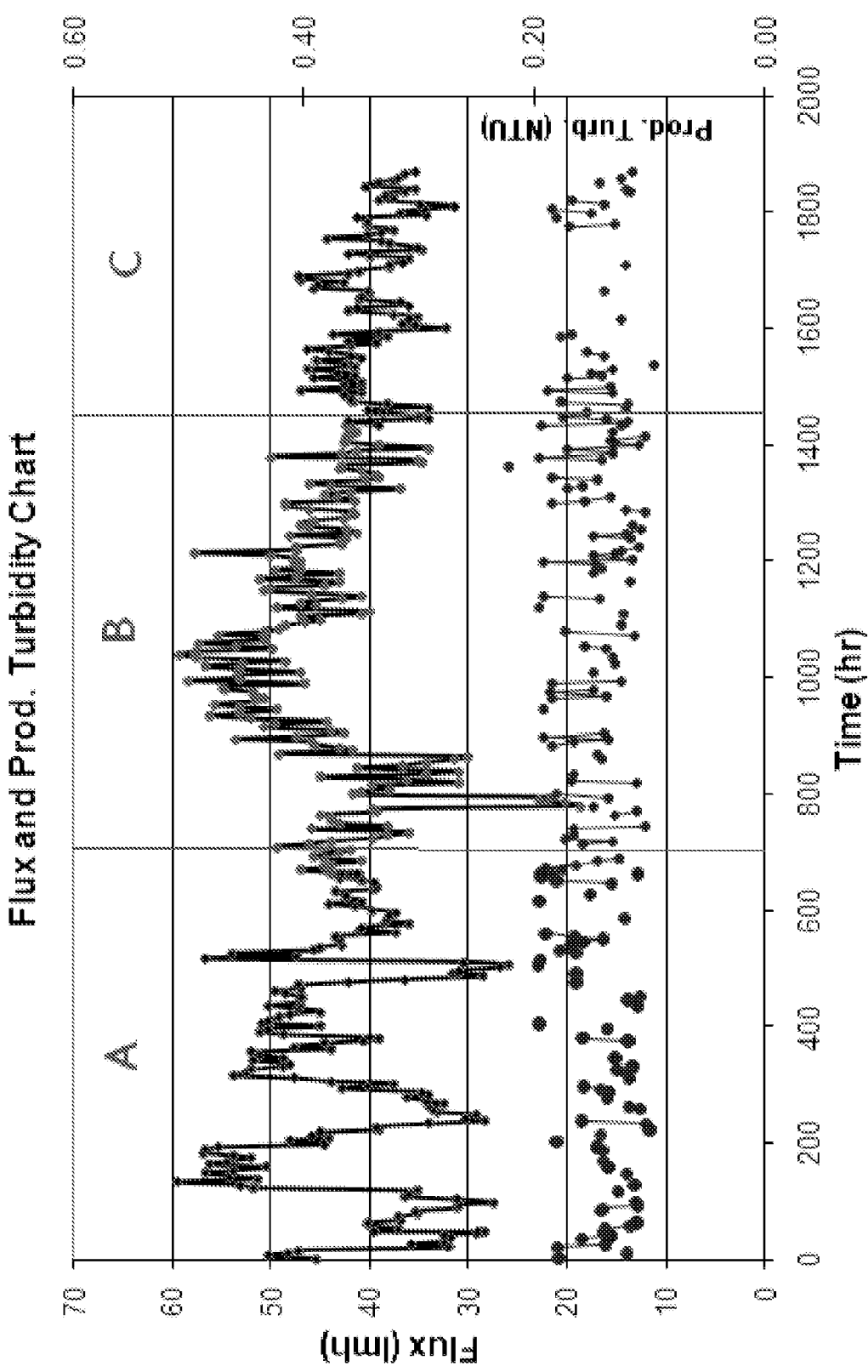
Figure: 5

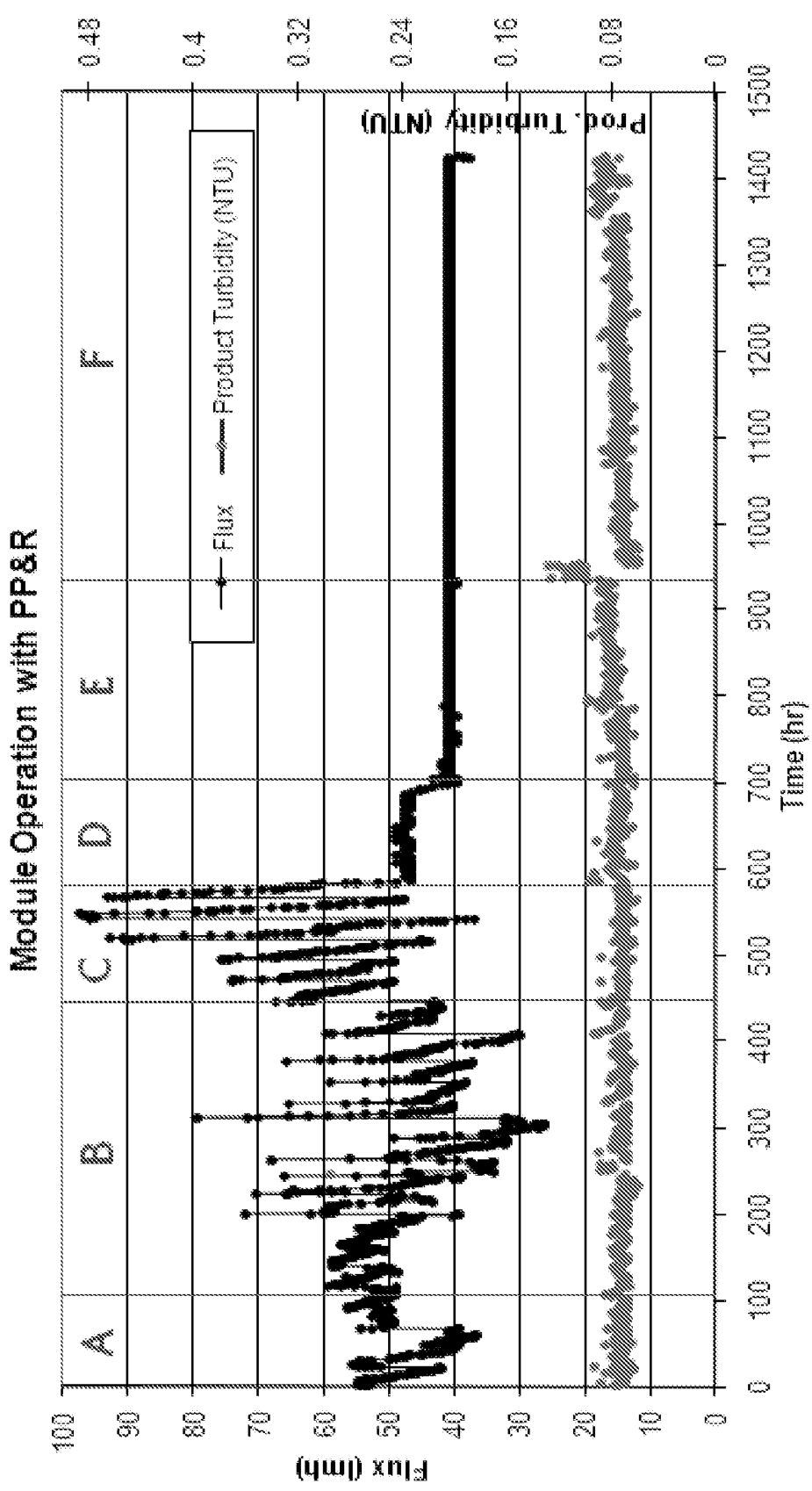
Figure: 6

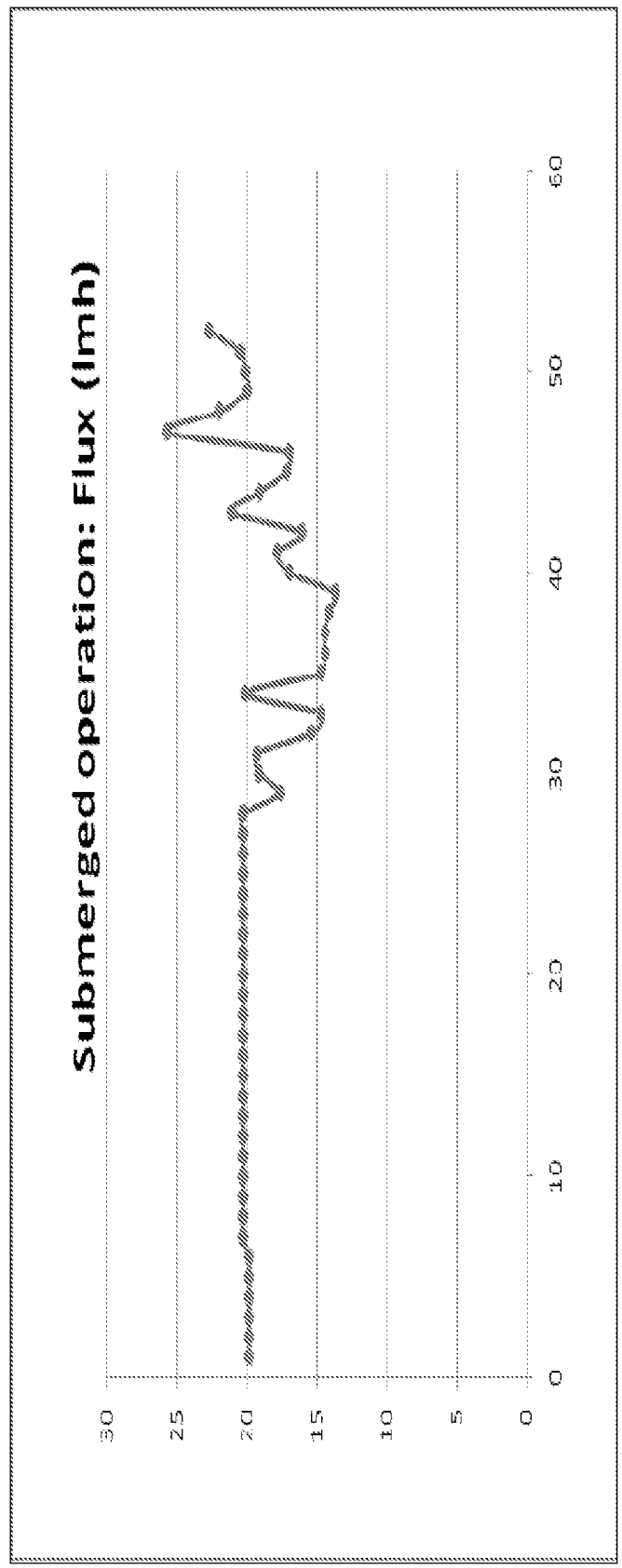
Figure: 7 (refer TABLE-C)

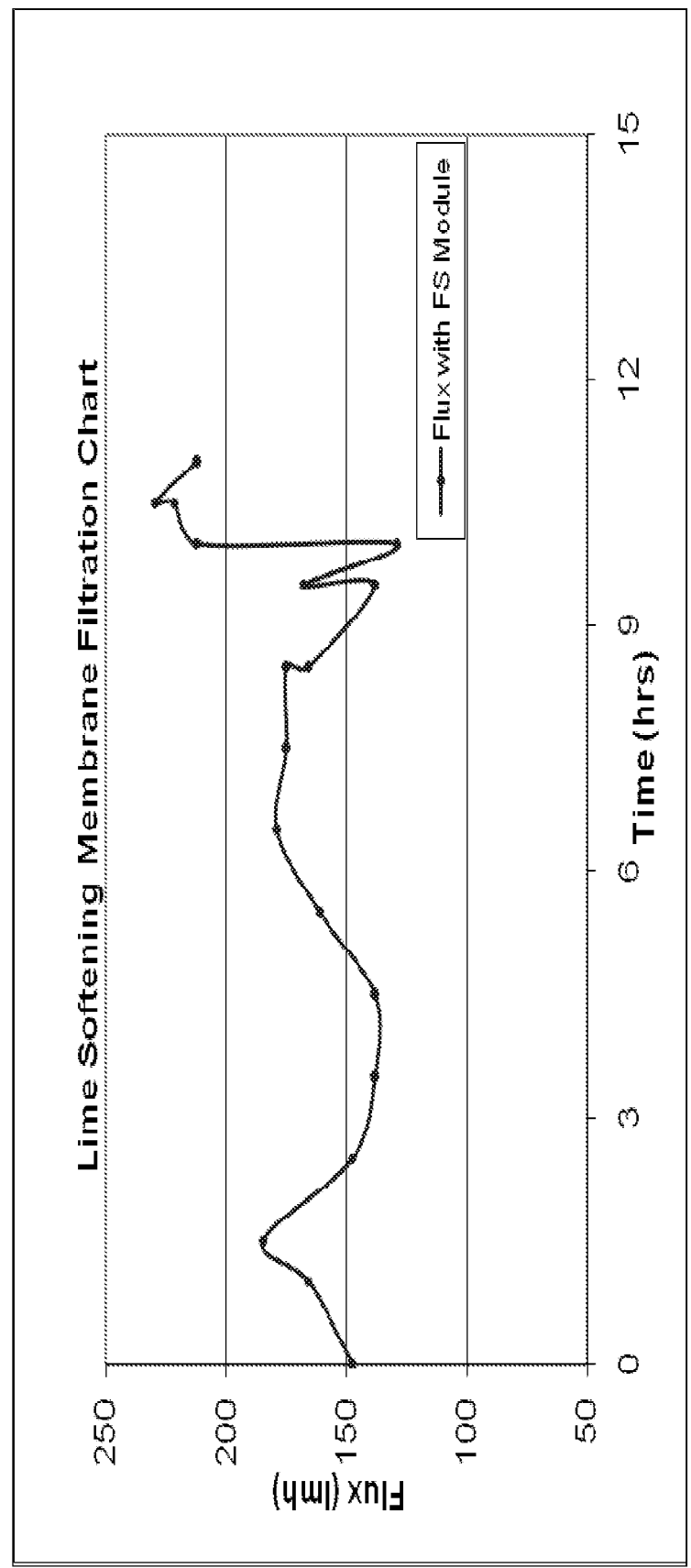
Figure: 8

ADVANCED FILTRATION DEVICE FOR WATER AND WASTEWATER TREATMENT

CROSS-REFERENCE TO RELATED APPLICATIONS

This application claims priority to U.S. Provisional Patent Application No. 61/319,339, filed on Mar. 31, 2010, and to Indian Provisional Patent Application No. 275/DEL/2010, filed on Feb. 9, 2010. Both priority documents are incorporated by reference herein.

BACKGROUND OF THE INVENTION

1. Field of the Invention

Embodiments of the present invention relate to a filtration module and/or a novel method of making a frameless filtration module for water or wastewater treatment that can produce filtrate that is free of particles, reduce precipitated hardness, colloids and organic compounds. The designed apparatus, which is either encapsulated or in cartridge form, can be assembled and disbanded easily to suit diverse process requirements. The module configuration and assembly also helps in clean-in-place, repair or replacement activities to be performed in situ. Also this includes operational conditions and parameters, which extends the filtration process without any flux decline without cleaning.

2. Background of the Related Art

Micro and ultra filtration membranes and modules are available in various sizes, shapes and configurations. A variety of membranes like hollow fibers, tubular and flat sheet membranes are configured to form filtration devices. Each type caters to a specific application area like surface water, ground water, seawater, municipal or industrial wastewater. Every type of membrane and the module design would work on variable operating parameters based on their configuration and process requirement. Some of these like hollow fibers or tubular membranes are self encapsulated and can be used as plug & play. But when it comes to repair or maintenance these are not user friendly at point of use as the membrane surfaces are permanently potted to the module. Others like cassettes or plate & frame devices are quite huge in size & volume and mostly work on non pressurized applications.

Productivity of these units is comparatively less than the encapsulated or packed fiber membrane modules. Maneuverability of these modules during maintenance operation is not easy due to their sizes. Hence there is hardly any module available in this particular field that can be used in multiple sectors of separation with flexibility on process parameters and easy to handle design.

BRIEF SUMMARY OF THE INVENTION

Embodiments of the invention are targeted towards developing a multipurpose filtration device that can be used in various segments of application and can be converted to encapsulated (pressurized) or submersible cassette or cartridge-type, facilitated with features that change the entire concept of cleaning, replacement and maintenance. Preferred embodiments provide a filtration device which can accommodate maximum filtration area, specifically avoid frames or provide a frameless surface, which does not provide any surfaces for debris to sit and build up and at the same time devise an operating protocol where maximum filtration sustainability can be maintained without going in for a chemical cleaning. This should also be easy to construct, assemble and operate. In a worst case if any irreversible fouling happens due to operational errors the modules can be disassembled and cleaned to re-establish original flux. The present invention relates to a filtration module and/or a novel method of making a filtration module that can separate particles, colloids, salts and treated organic compounds from water & wastewater. The designed apparatus is either encapsulated in a pressurized vessel or could be immersed in a tank in the form of sub assemblies (cartridges). This cartridge can be assembled and configured easily to suit diverse process requirements. The module configuration and assembly also helps in clean-in-place, repair or replacement activities that can be performed in situ.

Embodiments of the invention may have the following beneficial aspects. Of course, the actual extent of the embodiments of the invention will be determined by the scope of the claims and not limited by a need to satisfy one or more of the following aspects:

They may present a unique design of filtration device that can be used both in pressurized and submersible systems.

They allow a consistent product flow to be achieved with the filtration device even when used for heavily contaminated water with biological load.

Continuous flushing of membrane surfaces of the filtration device enables cleaning of the filtration surface and does not call for periodical backwash.

Maneuverability of cartridge inside the filtration device can be used in different sizes and volume with respect to its membrane surface area and application.

The filtration device can remove colloidal impurities for pre treatment segment of desalination (e.g. RO) or similar membrane based ultra pure water systems.

The filtration device can be used in membrane bioreactors to purify biological water under active sludge conditions.

The filtration device can be used to filter chemically treated water and separate heavy sludge.

The filtration device can be used in conjunction with a lime-soda dosing system to remove high hardness from feed water and produce consistent water quality with respect to product turbidity and hardness.

Membranes of different properties and ME's of different dimensions inside the filtration device can be easily used for varying application from dirty water to clear water in a similar design system.

Every single ME unit which is the filtering component of the said filtration device can be easily replaced in a module in situ.

The module could be used in an encapsulated mechanism devoid of any spillage or foul smell in case of grey water treatment.

Dismantling and assembling of the filtration device is easy and the system is friendly to the end user.

The said device can be used in a filtration system with low operating cost due to its less power consumption with respect to the total membrane surface area.

Membrane cartridge of the filtration device can be immersed in non pressurized feed tanks and operated for specific applications.

As the membrane envelopes (ME) in the filtration device allow water to flow outside to inside and there is a rigid base plate inside the ME, this ensures the complete safety of the membrane sealing points from puncture or damage under turbulent conditions.

During the operation of the said filtration device, air and water flow can be maneuvered based on the feed water characteristics to arrive at the optimal power consumption.

The filtration device can achieve very high recovery rate due to the absence of periodical backwash when operated under pressurized conditions.

Multiple housing & cartridge arrangement of the said filtration device facilitates easy transportation without the threat of breakage or damage.

BRIEF DESCRIPTION OF THE SEVERAL VIEWS OF THE FIGURES

FIG. 1: Membrane envelope (ME): ME shown is an assembled membrane element. It includes 'a' precut 2 membranes, 'b' one mother plate and 'c' two side plates. Side plate and mother plate (also referred to as a "central" or "base" plate) can be of polymeric material such as pvc, hips, pp etc which can be easily cut into shape, can be glued with other component and can withstand chemicals used in typical water filtration processes. Mother plate and side plates are cut to the design and glued or heat welded to form a surface on which a membrane can be welded externally. This generates a permeate path to follow and collect in a central hole connected to common header in the system. Two membranes, pre-cut, are welded over this plate forming one ME. Each ME has its own integrity and is checked individually for the water permeation and external leakages.

Figure 2A:
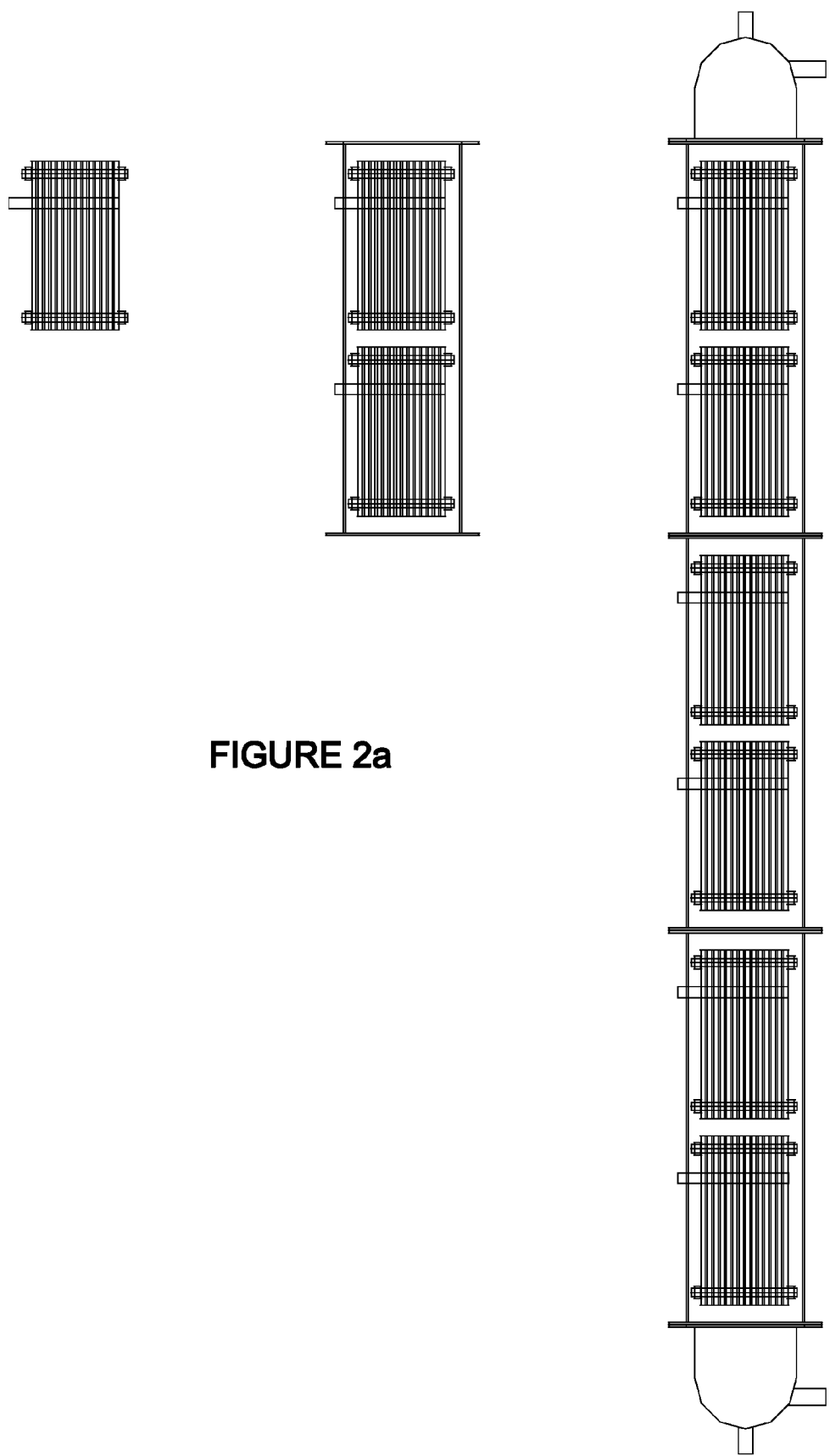
FIG. 2: Filtration Device assembly:
Assembly of ME cartridge
Assembly of Module Assembly of ME cartridge:
Forty to sixty ME's are packed with each other with specific gap in between and tightened by a common product header. This way one cassette is made.

Assembly of Module:
Section d-1 and d-2 in FIG. 2 are bottom and top cover. Section e-1, e-2 and e-3 are three sections with an outer body such that each section can be connected with each other and also connected with bottom and top covers. d-1: bottom cover has a inlet port for the feed and also has arrangement for sparging air through a defined air Spurger with holes drilled of 0.5 to 2 mm size. The Spurger is made of plastic or stainless steel material. e-1: this is an external housing which is fitted with the bottom cover externally. Within this chamber two ME cassettes can be housed marked as I and II. Each cassette has a product port which is connected to a common header. The product header collecting from all the ports allows the water to fall down as shown in the figure generating a small suction head but enough to keep positive pressure for product without any external energy.

Intermediate sections shown as e-1, e-2 and e-3 are three sections each of 1000 mm length. The design allows reducing these sections if required for limitation of height at any specific location which would reduce surface area in one module assembly. d-2: The top cover has an outlet for recirculating water with air which is recycled to the bio reactor unit placed separately. FIG. 2a shows a subassembly of three modules with three housings and with two cartridges in each housing.

FIG. 3: Shows a schematic of flow scheme of pressurized application

FIG. 4: Shows a schematic of flow scheme of submerged application

FIG. 5: Shows a graphical presentation of Data Example: 1
FIG. 6: Shows a graphical presentation of Data Example: 2
FIG. 7: Shows a graphical presentation of Data Example: 4
FIG. 8: Shows a graphical presentation of Data Example: 5
TABLE—A: Detailed log sheet of Data example—1
TABLE—B: Detailed log sheet of Data example—2
TABLE—C: Detailed log sheet of Data example—4

DETAILED DESCRIPTION OF THE INVENTION

Over last few decades membrane filtrations have proven to have great potential to service challenging separation needs and applications. At the same time the filtration devices need significant improvements to meet the newer applications in terms of their performance and user friendliness. Micro filtration and ultra filtration cater to a vast segment for water purification from comparatively clean water to chemically/biologically contaminated effluent. The following are considered to be basic necessities while configuring a filtration device, though of course the scope of this patent should be governed by the claims, and not by any compliance or non-compliance with any item or objective on this list.

1. A filtration module should be able to accommodate a large filtration area,
2. The module should not contain any frames or spacers. These are conventional feature of a plate and frame design but potentially create serious problems due to debris retention and holding.
3. The concept should allow low spacing between ME to ME, which can be varied if required without causing any adverse impact like fouling or scaling. This allows higher surface area in the cartridge.
4. There should be consistency in operating flux without significant decline with a specially designed operational protocol which is regularly used in running the modules.
5. In case of fouling & flux decline, the module and the internal components should be washable in situ.
6. During assembly the number of ME units and/or height/length of the module should be maneuverable to suit specific application.
7. The module should be easily integrated or disintegrated, if required and change some components in situ.
8. No permanently potted membrane surfaces are included.

Embodiments of the invention make this possible with flat film membrane envelopes. These envelopes may be presented in a pressurized module, which overcomes many limitations in the existing commercial modules. At the same time these membrane envelopes, in a plate & frame configuration, can be immersed in a non-pressurized tank that contains contaminated water for treatment. This could be suitable for micro filtration range or ultra filtration range or of superior type like nanofiltration or forward osmosis where high quality pre-treatment is not possible.

Although particular embodiments of the invention are described with reference to purification of water, it will be understood by those of skill in the art that other liquids might also be purified by the methods and apparatus reported herein. Liquids that might be purified include, for example, but are not limited to liquids in the pharmaceutical, food and beverage, and dairy industries.

Mother plate—Embodiments of the invention include a mother plate. The mother plate provides a solid surface. This is in a single piece molded plate or multiple plate assembly which provides a basic solid backbone over which membranes are glued or welded. The plate may have shallow cavities, corrugations or plastic spacers which provide the internal flow path and remain under membranes to facilitate water flow. The plate also has a permeate port which is interconnected with the flow path on the plates.

MEMBRANE ENVELOPE: Two flat membranes are sealed over a mother plate such that the filtering side of membranes is exposed outside, whereas the porous side (product collector) is encapsulated within the sealed chamber. The inside plate could be a single molded plate with cavity to facilitate water flow inside or a plate with plane surface sandwiched between two frames of similar size (as shown in FIG. 1) to create the internal base plate.

The membranes may be made, for example, from polyvinylidenefluoride, polysulphone, polyethersulfone, polyacrylonitrile, polyamide and/or similar polymers depending on the filtration duty and type of filtration required. Usually the polymer is coated on one side of a polyester non woven fabric. The coated surface becomes the filtering surface, and fabric remains exposed on the other side to allow the water to pass through.

Two membranes are sealed over a plastic section either of a gasket design or with full plate design. This is called a membrane envelope ("ME"). The membrane envelope, or "ME" is made by using a solid plastic support. This may be made of PVC or similar material. A membrane sheet is welded or glued on this along the periphery. Each ME could be 300-1000 mm in height, and normally 500 mm height. Typically a membrane envelope has a width between 150-500 mm, normally 300 mm wide. A typical ME is 2-5 mm thick. All the plastic supports go inside the membrane envelope. This help in gluing or welding the membrane and provide the necessary support to give membrane the necessary strength and rigidity and keeps membrane surfaces straight, stiff and smooth and also provides space for permeate to flow inside the membrane envelope.

Each ME is an independent component of a specific surface area with a built in permeate header for collecting the product (Refer FIG. 1). The permeate header is designed to remain at the top when the ME units are assembled to form a cartridge. Plates are perforated and provided with flow channels on both sides that are leading the permeated water to the product header at the top. Sealing of the membrane envelope is achieved by applying glue between the plastic and membrane fabric surface or heat welding the membrane with the plastic body. Integrity of the sealing is tested by applying backward water pressure from inside to outside. Applied testing pressure is normally one and half to five times that of typical operating pressure. Each ME can vary in filtration surface area based on the size of the ME and size of the housing. Using the information contained herein, one skilled in the art may determine an ME size that is optimum for feed water treatment and quantities to be treated.

Cartridges: A Cartridge is separate enclosure designed to accommodate and hold multiple ME units. The enclosure is typically a cuboids frame made of plastic or metal. Preferably the frame can withstand the feed water conditions and does not leach out anything that leads to contamination of feed water. The ME's are stacked inside the housing one after another, keeping equidistant from each other, and all independent product ports are connected to a common header. Distance between two ME units could be anything between 1 mm to 8 mm based on the end application that defines the module assembly parameters.

The distance between two ME units is maintained by using spacers of predetermined thickness. Spacers could be either a part of ME base plate or a separate component compatible for the assembly.

All ME units, when joined together, create and maintain equal gaps between them, and each product port of the respective ME forms a common header with the others. Sealing arrangements are provided on either side of the ME product port in the form of O-rings that interface with the corresponding ME port.

Integrity of the overall ME units and all the joints in a cartridge is achieved by studs at four corners across the width of the cartridge. These studs are tightened to get the compacted ME assembly and sealing of the product header. An advantage of this assembly is that the membrane surfaces on either side of the ME'S form the surfaces directly in contact with water and or air at certain velocity and flow and are flushing the membrane surface. As a result, membrane surfaces are continuously subjected to sweeping and scrubbing action, which at certain velocities are simulating cleaning conditions. There are no spacers or frame surfaces in between which are normally there in conventional filtration devices.

Depending on the type of water to be filtered and quality of water in terms of dissolved and suspended particles, one can have cross flow velocities at an optimum flux range without any fouling or adhesion to membrane surface. Because of this one can maintain narrow spacing between two membrane surfaces, resulting in high packing density of membrane surface. Also there is no frame between two membrane surfaces. This eliminates any surfaces between the membrane envelopes for particles to settle on, adhere or build on.

PROCESS: The above cartridges could be used, for example, in two types of filtration processes. One is a pressurized process when encapsulated inside a housing/vessel. Another the cartridges can be immersed in feed water and draw product water through suction pressure. Examples of these processes are described below.

Pressurized Process:

A filtration module, if encapsulated in a pressurized housing, should be erected near a feed water tank, preferably with a water column equal to the height of the module. In most cases the feed tank height, especially if it is a biological reactor, is more than 3.0 meters to facilitate optimum oxygen transfer from diffused air. The filtration device has been designed in a way that it could be assembled to obtain a height of more than 3.0 meters. This way, the module would be always filled with feed water with a positive water head inside it.

One recirculation pump of specific capacity based on the need of recirculation flow should be installed in between the feed tank and module. The pump would feed water to the module through the bottom end cap and throw it back to the feed tank through the top end cap. A piping arrangement should be employed between feed tank and filtration module. Because of the available positive water head the pump pressure requirement would be minimal, allowing water to permeate through the membrane surfaces and be collected in the product header. Air flow can be employed as appropriate, and air can be discharged at the top of the module when used; whereas the water is re-circulated to the feed tank. In this approach air quantity is optimized as the same air passes through multiple cartridges and sweeps and scrubs the multiple membrane surfaces. This helps in reducing air quantity per unit of membrane area and results in significant power savings.

HOUSING: In this embodiment the cartridges are inserted into a housing that is square or rectangular in shape from inside. The housings are made of plastic materials like PVC, polypropylene, FRP or any other cost effective plastic commercially available. The external shape could be anything, for example circular/hexagon or square as per the aesthetic desire. Each housing could hold one or two or more cartridges one above another with a gap between them that could be 10 mm to 100 mm as per the process requirement. Using the information contained herein, one skilled in the art may determine the gap between cartridges that is optimum based on the housing designed length. Cartridges are placed one above another in a way that the gaps between the ME units coincide with each other for two adjacent cassettes.

Module: A module is an assembly of a plurality of housings with their cartridges. The height of a module may vary depending on how many cartridges and housings are assembled together. The height can also be adjusted to suit the height of the storage tank feeding water or based on optimized process conditions. One or more than one housings and typically six to eight cartridges can be assembled together depending on the dimensions. Two housings are joined together using flanges, Victaulic or any other acceptable arrangement.

This arrangement and assembly facilitates feed water to flow in a linear direction from bottom to top through the gaps and flushes the membrane surfaces evenly. Four internal walls of the housing should maintain a gap with the periphery of the cassette that is equal or less than the gap between the ME units. This arrangement enforces the feed water to flow through the gaps of ME units rather than flowing along the internal wall of the housing. Alternatively all the four sides could be sealed to prevent by pass through the side gaps.

Product header of each cartridge is taken outside through a port provided in the housing. A sealing arrangement has been made both inside and outside of the housing in a manner that feed & product water does not mix together during operation. Preferably the arrangement is tested at a higher pressure (5 times) than the typical operating pressure. Product outlet header from each cartridge is connected to a common header fixed outside the housing. As the product headers of individual cartridges are always at the top of it, trapped air bubbles are released and the ME units remain filled up inside with product water. This ensures absolute contact and permeation through the outer filtering surface of the membranes. Housings may be joined to each other in multiple numbers to arrive at a required height and membrane surface area as per requirement. Top and bottom of the entire assembly with multiple housing is provided with end caps to box up the module in order to withstand specific pressure. The top end cap is provided with feed water recirculation flow port that also releases air (if used) from the module. The bottom end cap is provided with a feed water port and an air inlet port. Inside the end cap a special arrangement is made to facilitate inlet air to get diffused and passes through the gaps between the ME units.

Use of air is optional and can be used on intermittent or continuous service. Based on the service and gaps between the ME'S air distributor and the size of the air bubble can be changed from coarse to fine bubbles or vice versa. The end cap are designed for a given dimensions for a housing and same end caps can be used irrespective of how many housings are assembled together. One advantage of this concept is when the replacement happens after several years of operation only cartridges inside the module need replacement. The housings do not need to be replaced, and all the replacement happens outside the tank. Similarly all the maintenance work happens outside the tank after draining the water in a dry mode.

This filtration process across the membrane separates suspended particulates and colloids from water that tend to accumulate on the membrane surface. But continuous recirculation flow enables the membrane surfaces to be flushed with water all the time during operation and does not allow dirt to rest on the membranes. Separation of suspended and colloidal particles would result in building up of suspended particles (or sludge) in the feed tank through recirculated flow. Periodical blow down of feed tank in accordance with the raw water flow into the feed water would maintain the balance all through during the operation. Mild vacuum could be applied on the product header to enhance the flux rate, which could be anything between 25 mm HG to 200 mm HG depending on the type & quality of water. In certain applications a coarse filtration device or strainer is provided upstream of modules to prevent entry of abrasive material inside the cartridge.

Along with the water recirculation, air may be circulated through the dedicated port at the bottom end cap. This air would get diffused when passed through the diffuser mechanism fixed inside the bottom end cap. Diffused air bubbles would get mixed with the feed water and pass through the gaps between the ME units and released through the top end cap. This process would enable air bubbles to scrub through the membrane surfaces and enhance the dirt removal process. Also the small sizes of air bubbles would ensure no trapping of air within the thin gaps between the ME units. Air spurging also helps in preventing septic conditions inside the module, in case the feed water happens to a biologically enriched.

Feed water pressure, flow and velocity could be varying to manage various types of dirty water. Optimization of water flow & pressure is important to control the power consumption of the system. An option air scrubbing facility may be provided to keep the membrane surfaces clean when organic constituents are abundant in feed water. Depending on velocities of water and air flow, a steady state flux is achieved which is sustainable during continuous operation. Design of the membrane envelopes allows water to flow from outside to inside during filtration under trans-membrane pressure. This flow pattern and the rigid plate inside the membrane envelope ensures complete safety of the sealing joints of the membrane to plate from getting punctured or delaminated under highly turbulent conditions during operation.

Submerged Process:

In another embodiment of the invention the cartridges are assembled and submerged in an open tank with a facility for recirculation pump and air distribution. In this case an external housing is not used; however an external steel or plastic bracket support is used to keep cartridges in place. These brackets help in bolting down the cartridges or assembly of cartridges. In certain applications cartridges can be externally wrapped with wire mesh to prevent entry of any abrasive material inside the cartridge. Alternatively a coarse filtration device or strainer can also be provided. The cartridge assemblies are connected together through permeate lines to draw permeate under the influence of vacuum of around 100 mm water column. In this case the spacing between ME'S in the cartridge could be 2-6 mm, optimally between 3-4 mm. One also has the option of not operating the recirculation pump continuously to optimize power. To enhance the flow characteristics through cartridges, a recirculation pump can take suction from one end of the tank and discharge it into other end of the tank. The flow rate can be adjusted depending on the fouling potential of the water and power cost optimization. In this approach the flux is normally lower due to availability of lower driving pressure as a result power cost is also lower. This arrangement is specially preferred for waters with higher fouling potential because it operates at lower flux. This arrangement does not need any external piping except permeate piping.

A single cartridge or at least two cartridges, one above another could be installed inside an open tank in the process. The feed tank should have the facility of diffused aeration in case air scrubbing is required or feed water is biologically treated and contains active sludge. Air distribution arrangement can also be provided with individual assemble of cartridges below the cartridge. In addition there should be diffused aeration facility, which may be from the same blower, for the cartridges as well. This would help to unsettle any debris accumulated on the membrane surfaces. Suction through a vacuum pump, pump or a natural siphoning may be used to draw permeate at a variable or steady state.

In both approaches discussed above the basic cartridge design and components remain the same. The flexibility of adjusting spacing between ME's remains a significant advantage. Using these approaches and cartridges, either pressurized or submerged designs can be provided with very insignificant changes.

Cleaning:

Cleaning can be initiated at a defined frequency by emptying the module and washing with product water for a very brief duration. Type and frequency of cleaning would be different for pressurized and submerged processes.

Cleaning Process:

There are at least three approaches for cleaning for pressurized and submerged cartridges. The first is by using techniques which do not need chemicals and the second is by doing the same thing as done in the first but enhanced with chemicals. A third is by taking a shut down or taking the module offline and during a complete clean in place (CIP). These approaches are decided based on the application.

The most common philosophy is to use the first approach, minimize and reduce the need for the second and the third approaches. The device can work for days or months together in certain types of feed water with first approach on a regular frequency without any enhanced chemical cleaning or CIP. The cleaning could be with filtered/permeate water on a regular basis and could be enhanced less frequently with addition of cleaning chemicals in the feed water to get rid of any possible fouling. This may especially happen after shut downs or upset conditions in the feed water.

For a pressurized module other than draining and flushing protocols a PERMEATE PRESSURIZE AND RELEASE ("PP&R") protocol is very effective as a first approach. The PP&R operates on pressurize-depressurize mechanism. But this happens within the module with minimum quantity of water and without any water wastage. This involves stopping the water and or air flow through the module after closing the valve on permeate line and pressurizing the permeate header and allowing the water to depressurize within the module. This is normally followed by an air scrubbing step. This protocol requires holding water volume in the permeate header which could be a normal part of the design or specially designed as a part of piping sometimes. This protocol is implemented once in 5-60 minutes and helps in extending requirement of enhanced chemical cleaning and CIP and this takes only 30-60 seconds. Regular operation resumes after the PP&R protocol is employed. A similar protocol may be employed for submerged modules using the pressure head in the permeate header.

Various cleaning chemicals could be used for enhanced cleaning and CIP depending on the type of fouling on the membrane surfaces. In case of biological fouling generally sodium hypochlorite solution (100 to 500 ppm) is passed through the membrane units and soaked for a brief period. Citric acid is also used to facilitate removal of metallic fouling. In case of corrosive fouling like iron or hardness, mild hydrochloric acid solution could be passed through the cassettes. The selection of cleaning chemicals is done based on membrane material and type of foulants. Chlorine sensitivity of membrane polymeric material is important before a cleaning chemical regime is decided.

To start the cleaning cycle, first it is necessary to break the service cycle and drain the feed water from the module. A clean-in-place system comprising of pump, tank and associated piping and instruments should facilitate the cleaning cycle. Freshly prepared chemical solution should be re-circulated through the module at a low flow rate for a maximum period of 5 minutes. After this the recirculation flow should be stopped and module, that is filled up with cleaning solution should be allowed to soak for a period of 15 minutes to 30 minutes based on the fouling conditions. After this again the recirculation should be started and continued for a maximum period of 5 minutes as done before soaking. Then the entire cleaning solution in the module should be drained or if possible, neutralized and mixed with feed water over a period of time.

Filtered water should be used to rinse the module free of cleaning chemical and Service cycle could be re-started. Pressurized modules can be cleaned individually or all together. Submerged modules can also be cleaned external to the tank by disconnecting one or more cartridges at a time and taking them for cleaning in an external CIP system. This will facilitate production when some modules are under cleaning.

Data Example-1

Treating biological water having 8000 to 10000 mixed liquid suspended solid (MLSS). In one configuration having six cartridges mounted one above other such that two cassette form one Housing. Each cartridge having two ME units with 1.0 mm gap between two corresponding ME units.

Biological water was simulated and maintained with 5000 to 10000 miss of biological mass.

Operational Sequence Adopted Under Three Distinct Conditions of Parameters:

A: Operational Parameters
  i. Collection of product for 10 minutes followed by 1 min of rest.
  ii. Variable flux operation
  iii. Cleaning with permeate after 6 hrs of operation to regain the flux.
  iv. Product: under 100 mm hg vacuum

TABLE I (refer FIG.: 5 block A)

| Feed flow M3/h | Feed Pressure psi | Air flow M3/h | Air Pressure psi | Flux (avg) lm$^2$h | Product Quality NTU |
|---|---|---|---|---|---|
| 0.4 to 2.0 | 5 to 12 | 0.5 to 2.0 | 5-7 | 25 to 52 | <0.2 |

This confirms the system performance to deliver good flux and product quality. Here the system was allowed to operate at maximum flux for a given feed water pressure. Though the flux was showing decline after 50-100 hours of running and reaching to 25-30 lmh level but after permeate flushing normal flux could be restored. With time it was also observed that the duration between two cleaning was increasing. There is no water wastage in the process.

B: Operational Parameters
  i. Without any rest time between cleaning.
  ii. Variable flux operation
  iii. Cleaning with permeate after 6 hrs of operation to regain the flux
  iv. Product: under 100 mm hg vacuum

TABLE II (refer FIG.: 5 block B)

| Feed flow M3/h | Feed Pressure psi | Air flow M3/h | Air Pressure psi | Flux (avg) lm²h | Product Quality NTU |
|---|---|---|---|---|---|
| 0.45 | 6 | 0.95 | 10 | 35 to 55 | <0.2 |

About 600 hours of operation without any rest time like Example—1A resulted in similar results but due to the elimination of 1 minute rest time in every 10 minutes, overall recovery increased. Also the duration between two cleaning cycles appeared to be steady. There is no water wastage in the process.

C: Operational Parameters—Flow Parameters Adjusted at the Optimum Level from Power Consumption point of view,
  i. Without any rest time between cleaning.
  ii. Variable flux operation
  iii. Cleaning with permeate after 6 hrs of operation to regain the flux.
  iv. Product: under 100 mm hg vacuum

TABLE III (refer FIG.: 5 block C)

| Feed flow M3/h | Feed Pressure psi | Air flow M3/h | Air Pressure psi | Flux (avg) lm²h | Product Quality NTU |
|---|---|---|---|---|---|
| 0.22 | 6 | 0.50 | 7 to 9 | 35 to 45 | <0.2 |

In this experiment only one set of ME unit was used and the extreme sides were blocked with gasket to prevent any by pass. Feed water flow and air flow were kept constant and lowest compared to the earlier two experiments. Flux value of >40 could be achieved with consistent product quality of <0.2 NTU. In 150 hours a cleaning was required.

PP&R Operation:

A novel approach was to establish operation with PP&R, which involves allowing permeate to Pressurize and de-pressurize in the feed side. This happens when the pressure is allowed to build up in the permeate side by c throttling the permeate line valve and switching off the feed pump after few seconds. The PP&R happens for 10-60 seconds and it dislodges debris or foulants from the membrane surface outside. All this happens at a very low differential pressure with water that is residing within the module on the product side and does not result into any water wastage. When the module was opened after several hundred hours of operation the membrane surfaces were found very clean. The extent of fouling on the membrane surface is reflected in the residual permeate pressure on the permeate pipe on the upstream side of the valve. This pressure starts with 4-5 psi and then gradually decreases as the fouling builds on the membrane surface but regains the pressure after the PP&R step and after that a steady state arrives when the pressure stabilizes to a constant value. This is very effective when performed frequently before too much build up happens. In this approach permeate water is withdrawn through siphoning process which does not require addition of a driving force on the feed side and does not result in additional power consumption.

To explain further, when water and air is introduced in the feed some pressure can be created by throttling the product valve. Using this technique when intermediate stoppage happens, a residual pressure is created on the product side. With no feed flow this relaxes pressure on the feed side. As a result of this water flows from permeate to feed side causing the sludge or coating to get removed. Whereas the membrane remains pressurized from outside to inside in permeate production mode, it moves from inside to outside in PP&R mode. This results in shaking the membrane on the dirty surface and removal of the sludge/dirt. This process helps in increasing the length before cleaning and often does not require cleaning for a long period of time.

In this approach product side cannot be highly pressurized and therefore a mild vacuum is required to deliver permeate. Introduction of vacuum asks for additional machine and additional cost. But without a minimum driving force the productivity would be poor. This is addressed by created siphon on the product line which does not need any additional equipment and works very well in this specific design. Examples of this are detailed below.

Data Example-2

In the second set of trials the gap between two ME's was increased for 1.0 mm to 1.5 mm.
Biological water was simulated and maintained with 8000 to 14000 miss of biological mass.
Effective membrane surface area: 0.528 M²
Numbers of ME units: 6
Gap between ME units: 1.5 mm Different operational sequences adopted are as follow. As mentioned above, PP&R was employed in this series of experiments.

A:
  i. Collection of product for 10 minutes followed by 1 min of PP&R protocol
  ii. Variable flux operation
  iii. Product: By Siphon

TABLE IV (refer FIG.: 6 block A)

| Feed flow M3/h | Feed Pressure psi | Air flow M3/h | Air Pressure psi | Flux (avg) lm²h | Product Quality NTU |
|---|---|---|---|---|---|
| 0.70 | 7 to 8 | 0.4 | 6.5 | 40 to 60 | <0.10 |

Enhanced chemical cleaning was required at regular intervals.

B:
  i. Collection of product for 30 minutes followed by 1 min of PP&R.
  ii. Variable flux operation
  iii. Product: By Siphon

TABLE V (refer FIG.: 6 block B)

| Feed flow M3/h | Feed Pressure psi | Air flow M3/h | Air Pressure psi | Flux (avg) lm²h | Product Quality NTU |
|---|---|---|---|---|---|
| 0.5 to 0.7 | 7 to 10.5 | 0.2 to 0.4 | 6.5 to 10 | 30 to 70 | <0.10 |

In this experiment it was observed that an extended service cycle is possible. But enhanced chemical cleaning was employed only when there was a substantial flux decline. It was understood that a regular enhanced chemical cleaning interval would result in steady flux and quality.

C: With the Data Generated with Varying Cleaning Norms and Different Feed Flow and Pressure the Further Operations Switched on to Cleaning at Regular Interval.
  i. Collection of product for 30 minutes followed by 1 min of PP&R

TABLE VI (refer FIG.: 6 block C)

| Feed flow M3/h | Feed Pressure psi | Air flow M3/h | Air Pressure psi | Flux (avg) lm²h | Product Quality NTU |
|---|---|---|---|---|---|
| 0.70 | 7 to 10 | 0.40 | 6.5 to 7.25 | 50 to 80 | <0.15 |

This experiment resulted flux values as high as 80 lmh.
D: The Next Operation was with a Constant Flux
  i. Collection of product for 30 minutes followed by 1 min of PP&R
  ii. Product: constant flux of 47 lmh.

TABLE VII (refer FIG.: 6 block D)

| Feed flow M3/h | Feed Pressure psi | Air flow M3/h | Air Pressure psi | Flux (avg) lm²h | Product Quality NTU |
|---|---|---|---|---|---|
| 0.50 | 7 to 9.5 | 0.30 | 7.5 to 8.5 | 47 ± 2 | <0.10 |

E: This Experiment was Done with Lower Fixed Flux of 40-42 in Place of 47 lmh Done Previous Experiment.

TABLE IX (refer FIG.: 6 block E)

| Feed flow M3/h | Feed Pressure psi | Air flow M3/h | Air Pressure psi | Flux (avg) lm²h | Product Quality NTU |
|---|---|---|---|---|---|
| 0.50 | 7 to 9.5 | 0.30 | 7.5 to 8.5 | 42 ± 2 | <0.10 |

This experiment could be continued for almost 200 hours without employing any cleaning.
F: PP&R Frequency was Changed from 30 mls to 15 mls Keeping Other Parameters Same.
  i. Collection of product for 15 minutes followed by 1 min of PP&R
  ii. Product: constant flux of 40±2 lmh.

TABLE X (refer FIG.: 6 block F)

| Feed flow M3/h | Feed Pressure psi | Air flow M3/h | Air Pressure psi | Flux (avg) lm²h | Product Quality NTU |
|---|---|---|---|---|---|
| 0.50 | 7 to 9.5 | 0.30 | 7.5 to 8.5 | 40 ± 2 | <0.10 |

About 500 hours of operation was done without any chemical cleaning. In a subsequent trial this experiment was repeated with similar results and also an experiment was done with 10 minutes operation and 1 minute PP&R with longer operational cycles without any enhanced cleaning or CIP.

Data Example-5

One submerged operational trial was conducted in the laboratory with a similar set up as shown in FIG. 4.

TABLE XII (refer FIG.: 7)

| Feed flow M3/h | Feed Pressure psi | Air flow M3/h | Air Pressure psi | Flux (avg) lm²h | Product Quality NTU |
|---|---|---|---|---|---|
| 0.20 | 7 to 9.5 | 0.55 | 0.17 | 15 to 25 | <0.10 |

Data Example-6

This experiment was performed to evaluate performance of the filtration device on lime softening service. This is a unique operation to enhance the product quality of lime-soda mixed water by using the above pressurized filtration device. This enables to get rid of huge clarifiers and facilitates getting consistent product quality with very low hardness. Laboratory trial was conducted by using a flash mixer upstream of the filtration device and dosing lime and soda ash or caustic soda. The dosing quantities are calculated based on hardness and alkalinity of water. This high level precipitated hardness was allowed to pass through this membrane filtration device.

TABLE XIII (refer FIG.: 8)

| Feed flow lph | Feed Pressure psi | Air flow M3/h | Air velocity m/s | Flux (avg) lm²h | Feed hardness Mg/l | Product hardness Mg/l |
|---|---|---|---|---|---|---|
| 20 to 30 | 1.5 | 1.0 | 0.14 | 150-225 | 400-600 | 5-35 |

The product hardness was in the 5-10 range most of the times.

TABLE A (Detailed log sheet of Data Example-1)

| | Product | | Feed | | Feed Air | |
|---|---|---|---|---|---|---|
| Time hr | Flux lmh | Turbidity NTU | Flow m3/hr | Pressure Psi | Flow m3/hr | Velocity m/s |
| 0.50 | 45.5 | 0.179 | 0.4 | 5.5 | 0.75 | 0.46 |
| 5.00 | 50.3 | | 0.4 | 5.5 | 0.75 | 0.46 |
| 10.00 | 48.3 | 0.120 | 0.4 | 5.5 | 0.75 | 0.46 |
| 15.00 | 47.2 | | 0.4 | 5.5 | 0.75 | 0.46 |
| 20.00 | 32.0 | 0.180 | 0.4 | 5.5 | 0.75 | 0.46 |
| 25.00 | 35.7 | 0.138 | 0.4 | 5.5 | 0.75 | 0.46 |
| 30.00 | 32.5 | | 0.4 | 5.5 | 0.75 | 0.46 |
| 35.00 | 31.8 | 0.159 | 0.4 | 5.5 | 0.75 | 0.46 |
| 40.00 | 32.6 | 0.133 | 0.4 | 5.5 | 0.75 | 0.46 |
| 45.00 | 29.2 | | 0.4 | 5.5 | 0.75 | 0.46 |
| 52.00 | 37.1 | 0.138 | 0.4 | 5.5 | 0.75 | 0.46 |
| 62.00 | 40.2 | 0.111 | 0.4 | 5.5 | 0.75 | 0.46 |
| 72.00 | 37.2 | | 0.4 | 5.5 | 0.75 | 0.46 |
| 82.00 | 35.5 | 0.142 | 0.8 | 5.5 | 1.00 | 0.62 |
| 92.00 | 31.0 | 0.110 | 0.6 | 5.5 | 1.00 | 0.62 |
| 102.00 | 31.2 | | 0.6 | 5.5 | 1.00 | 0.62 |
| 112.00 | 36.0 | | 2.0 | 12.0 | 1.00 | 0.62 |
| 122.00 | 51.8 | | 2.0 | 12.0 | 0.50 | 0.31 |
| 132.00 | 59.6 | | 2.0 | 12.0 | 0.50 | 0.31 |
| 142.00 | 54.1 | | 2.0 | 12.0 | 0.50 | 0.31 |
| 152.00 | 53.9 | | 2.0 | 12.0 | 0.50 | 0.31 |
| 162.00 | 56.2 | | 2.0 | 12.0 | 0.50 | 0.31 |
| 172.00 | 52.0 | | 2.0 | 12.0 | 0.50 | 0.31 |
| 182.00 | 56.9 | | 2.0 | 12.0 | 0.50 | 0.31 |
| 192.00 | 55.4 | 0.145 | 2.0 | 13.0 | 0.50 | 0.31 |
| 202.00 | 48.1 | 0.181 | 1.6 | 11.0 | 1.40 | 0.86 |
| 252.00 | 33.1 | | 1.0 | 8 | 1.00 | 0.62 |
| 305.00 | 43.9 | | 0.8 | 7.0 | 1.00 | 0.62 |

TABLE A-continued (Detailed log sheet of Data Example-1)

| | Product | | Feed | | Feed Air | |
|---|---|---|---|---|---|---|
| Time hr | Flux lmh | Turbidity NTU | Flow m3/hr | Pressure Psi | Flow m3/hr | Velocity m/s |
| 350.00 | 51.3 | | 1.0 | 7.5 | 1.00 | 0.62 |
| 400.00 | 45.0 | | 0.8 | 6.5 | 1.00 | 0.62 |
| 450.00 | 46.8 | 0.108 | 0.8 | 7.0 | 2.00 | 1.23 |
| 450.50 | 46.9 | | 0.8 | 7.0 | 2.00 | 1.23 |
| 500.00 | 26.8 | | 0.8 | 6.5 | 2.00 | 1.23 |
| 550.00 | 43.1 | 0.140 | 0.8 | 7.5 | 2.00 | 1.23 |
| 600.00 | 39.8 | | 1.2 | 9.5 | 2.00 | 1.23 |
| 650.00 | 40.8 | 0.181 | 1.2 | 10.0 | 2.00 | 1.23 |
| 655.00 | 43.1 | 0.194 | 1.2 | 10.0 | 2.00 | 1.23 |
| 660.00 | 43.2 | | 1.2 | 10.0 | 2.00 | 1.23 |
| 660.50 | 42.6 | | 1.2 | 10.0 | 2.00 | 1.23 |
| Operational Sequence - No rest time Continuous operation for 6.0 hrs and then cleaning with permate water. | | | | | | |
| 663.00 | 44.0 | 0.185 | 0.45 | 6.0 | 0.95 | 0.59 |
| 668.00 | 46.9 | 0.175 | 0.45 | 6.0 | 0.95 | 0.59 |
| 673.00 | 44.6 | 0.190 | 0.45 | 6.0 | 0.95 | 0.59 |
| 678.00 | 43.8 | 0.164 | 0.45 | 6.0 | 0.95 | 0.59 |
| 683.00 | 40.9 | 0.145 | 0.45 | 6.0 | 0.95 | 0.59 |
| 688.00 | 44.6 | 0.126 | 0.45 | 6.0 | 0.95 | 0.59 |
| 693.00 | 45.7 | | 0.45 | 6.0 | 0.95 | 0.59 |
| 698.00 | 43.1 | | 0.45 | 6.0 | 0.95 | 0.59 |
| 703.00 | 41.8 | | 0.45 | 6.0 | 0.95 | 0.59 |
| 723.00 | 39.7 | 0.174 | 0.45 | 6.0 | 0.95 | 0.59 |
| 743.00 | 38.2 | 0.104 | 0.45 | 6.0 | 0.95 | 0.59 |
| 763.00 | 44.9 | 0.131 | 0.45 | 6.0 | 0.95 | 0.59 |
| 793.00 | 21.8 | 0.135 | 0.45 | 6.0 | 0.95 | 0.59 |
| 803.00 | 40.9 | | 0.45 | 6.0 | 0.95 | 0.59 |
| 853.00 | 34.3 | | 0.45 | 6.0 | 0.95 | 0.59 |
| 903.00 | 42.6 | 0.140 | 0.45 | 6.0 | 0.95 | 0.59 |
| 953.00 | 55.8 | | 0.45 | 6.0 | 0.95 | 0.59 |
| 1003.00 | 53.4 | | 0.45 | 6.0 | 0.95 | 0.59 |
| 1053.00 | 53.5 | 0.157 | 0.45 | 6.0 | 0.95 | 0.59 |
| 1103.00 | 47.0 | | 0.45 | 6.0 | 0.95 | 0.59 |
| 1153.00 | 50.2 | | 0.45 | 6.0 | 0.95 | 0.59 |
| 1203.00 | 47.7 | 0.115 | 0.45 | 6.0 | 0.95 | 0.59 |
| 1253.00 | 42.5 | 0.107 | 0.45 | 6.0 | 0.95 | 0.59 |
| 1303.00 | 41.5 | 0.156 | 0.45 | 6.0 | 0.95 | 0.59 |
| 1353.00 | 40.8 | | 0.45 | 6.0 | 0.95 | 0.59 |
| 1403.00 | 42.6 | 0.130 | 0.45 | 6.0 | 0.95 | 0.59 |
| 1433.00 | 42.5 | 0.125 | 0.45 | 6.0 | 0.95 | 0.59 |
| Operation with Optimized operational parameters and single gap of ME | | | | | | |
| 1433.50 | 39.1 | 0.194 | 0.220 | 5.5 | 0.5 | 0.62 |
| 1438.5 | 42.3 | 0.119 | 0.220 | 5.5 | 0.5 | 0.62 |
| 1443.5 | 34.1 | 0.137 | 0.220 | 5.5 | 0.5 | 0.62 |
| 1448.5 | 35.2 | 0.175 | 0.220 | 5.5 | 0.5 | 0.62 |
| 1453.5 | 38.6 | 0.155 | 0.220 | 5.5 | 0.5 | 0.62 |
| 1463.5 | 34.1 | 0.120 | 0.220 | 5.5 | 0.5 | 0.62 |
| 1473.5 | 41.7 | 0.177 | 0.220 | 5.5 | 0.5 | 0.62 |
| 1483.5 | 42.7 | | 0.220 | 5.5 | 0.5 | 0.62 |
| 1493.5 | 47.0 | 0.189 | 0.220 | 6.0 | 0.5 | 0.62 |
| 1503.5 | 42.7 | | 0.220 | 6.0 | 0.5 | 0.62 |
| 1513.5 | 45.7 | 0.171 | 0.220 | 6.0 | 0.5 | 0.62 |
| 1523.5 | 43.2 | 0.150 | 0.220 | 6.0 | 0.5 | 0.62 |
| 1533.5 | 41.5 | | 0.220 | 6.0 | 0.5 | 0.62 |
| 1543.5 | 45.4 | | 0.220 | 6.0 | 0.5 | 0.62 |
| 1553.5 | 41.9 | 0.140 | 0.220 | 6.0 | 0.5 | 0.62 |
| 1598.5 | 32.3 | | 0.220 | 6.0 | 0.4 | 0.49 |
| 1653.5 | 40.9 | | 0.275 | 6.0 | 0.4 | 0.49 |
| 1703.5 | 38.0 | | 0.275 | 7.5 | 0.4 | 0.49 |
| 1753.5 | 44.5 | | 0.325 | 8.0 | 0.4 | 0.49 |
| 1803.5 | 34.5 | 0.184 | 0.220 | 7.5 | 0.325 | 0.40 |
| 1853.5 | 37.5 | | 0.220 | 7.5 | 0.325 | 0.40 |
| 1863.5 | 36.4 | | 0.220 | 7.5 | 0.325 | 0.40 |
| 1868.5 | 35.5 | 0.115 | 0.220 | 7.5 | 0.325 | 0.40 |

| Time Total hr | Service Time/Rest Time Min | Product Flux lmh | Product Turbidity NTU | Feed Flow m3/hr | Feed Pressure Psi | Feed Air Flow m3/hr |
|---|---|---|---|---|---|---|
| 0.5 | 10 + 1 | 53.4 | 0.075 | 0.70 | 7.0 | 0.40 |
| 1.0 | 10 + 1 | 53.1 | | 0.70 | 7.0 | 0.40 |
| 5.0 | 10 + 1 | 52.5 | | 0.70 | 7.0 | 0.40 |
| 5.5 | 10 + 1 | 54.8 | | 0.70 | 7.0 | 0.40 |
| 6.0 | 10 + 1 | 54.2 | 0.074 | 0.70 | 7.0 | 0.40 |
| 7.0 | 10 + 1 | 53.5 | 0.071 | 0.70 | 7.0 | 0.40 |
| 8.0 | 10 + 1 | 52.5 | 0.070 | 0.70 | 7.0 | 0.40 |
| 9.0 | 10 + 1 | 50.9 | 0.071 | 0.70 | 7.0 | 0.40 |
| 10.0 | 10 + 1 | 50.6 | 0.073 | 0.70 | 7.0 | 0.40 |
| 11.0 | 10 + 1 | 49.3 | 0.072 | 0.70 | 7.0 | 0.40 |
| 12.0 | 10 + 1 | 48.9 | 0.068 | 0.70 | 7.0 | 0.40 |
| 13.0 | 10 + 1 | 48.2 | 0.070 | 0.70 | 7.0 | 0.40 |
| 14.0 | 10 + 1 | 47.0 | 0.072 | 0.70 | 7.0 | 0.40 |
| 15.0 | 10 + 1 | 46.6 | 0.076 | 0.70 | 7.0 | 0.40 |
| 16.0 | 10 + 1 | 45.7 | 0.080 | 0.70 | 7.0 | 0.40 |
| 17.0 | 10 + 1 | 44.7 | 0.073 | 0.70 | 7.0 | 0.40 |
| 18.0 | 10 + 1 | 43.9 | | 0.70 | 7.0 | 0.40 |
| 19.0 | 10 + 1 | 42.2 | 0.078 | 0.70 | 7.0 | 0.40 |
| 20.0 | 10 + 1 | 42.0 | 0.063 | 0.70 | 7.0 | 0.40 |
| 25.0 | 10 + 1 | 55.7 | | 0.70 | 7.0 | 0.40 |
| 30.0 | 10 + 1 | 52.8 | | 0.70 | 7.0 | 0.40 |
| 35.0 | 10 + 1 | 47.0 | 0.076 | 0.70 | 7.0 | 0.40 |
| 40.0 | 10 + 1 | 41.3 | | 0.70 | 7.0 | 0.40 |
| 45.0 | 10 + 1 | 40.1 | 0.068 | 0.70 | 7.0 | 0.40 |
| 55.0 | 10 + 1 | 39.4 | 0.071 | 0.70 | 7.0 | 0.40 |
| 60.0 | 10 + 1 | 40.5 | 0.074 | 0.70 | 7.0 | 0.40 |
| 65.0 | 10 + 1 | 40.2 | 0.072 | 0.70 | 7.0 | 0.40 |
| 70.0 | 10 + 1 | 51.0 | 0.074 | 0.70 | 7.5 | 0.40 |
| 75.0 | 10 + 1 | 50.2 | | 0.70 | 8.0 | 0.40 |
| 80.0 | 10 + 1 | 50.7 | 0.069 | 0.70 | 8.0 | 0.40 |
| 85.0 | 10 + 1 | 51.1 | | 0.70 | 8.0 | 0.40 |
| 90.0 | 10 + 1 | 51.6 | 0.073 | 0.70 | 8.0 | 0.40 |
| 90.5 | 10 + 1 | 56.3 | 0.075 | 0.70 | 8.0 | 0.40 |
| 95.0 | 10 + 1 | 54.3 | | 0.70 | 8.0 | 0.40 |
| 100.0 | 10 + 1 | 51.6 | 0.071 | 0.70 | 8.0 | 0.40 |
| 110.0 | 20 + 1 | 52.3 | | 0.70 | 8.0 | 0.40 |
| 120.0 | 30 + 1 | 55.3 | | 0.70 | 8.0 | 0.40 |
| 130.0 | 30 + 1 | 51.9 | 0.075 | 0.70 | 8.0 | 0.40 |
| 140.0 | 30 + 1 | 57.9 | | 0.70 | 8.5 | 0.40 |
| 150.0 | 30 + 1 | 55.7 | | 0.70 | 8.5 | 0.40 |
| 160.0 | 30 + 1 | 51.59 | | 0.70 | 9.5 | 0.40 |
| 170.0 | 30 + 1 | 54.32 | | 0.70 | 9.5 | 0.40 |
| 180.0 | 30 + 1 | 52.84 | | 0.70 | 9.5 | 0.40 |
| 190.0 | 30 + 1 | 48.18 | | 0.70 | 9.5 | 0.40 |
| 200.0 | 30 + 1 | 60.00 | 0.075 | 0.70 | 9.5 | 0.40 |
| 210.0 | 30 + 1 | 57.27 | | 0.70 | 9.5 | 0.40 |
| 220.0 | 30 + 1 | 46.14 | | 0.70 | 10.0 | 0.40 |
| 230.0 | 30 + 1 | 49.89 | 0.069 | 0.70 | 10.0 | 0.40 |
| 240.0 | 30 + 1 | 42.61 | 0.07 | 0.70 | 10.5 | 0.40 |
| 250.0 | 30 + 1 | 35.91 | | 0.50 | 9.0 | 0.20 |
| 260.0 | 30 + 1 | 37.50 | | 0.50 | 9.0 | 0.20 |
| 270.0 | 30 + 1 | 44.32 | 0.069 | 0.70 | 12.0 | 0.40 |
| 280.0 | 30 + 1 | 32.39 | | 0.70 | 12.5 | 0.40 |
| 290.0 | 30 + 1 | 35.57 | | 0.50 | 11.0 | 0.20 |
| 300.0 | 30 + 1 | 27.05 | | 0.50 | 11.0 | 0.20 |
| 310.0 | 30 + 1 | 32.16 | | 0.70 | 12.0 | 0.40 |
| 325.0 | 30 + 1 | 40.68 | | 0.70 | 11.0 | 0.40 |
| 350.0 | 30 + 1 | 39.55 | | 0.70 | 10.25 | 0.40 |
| 375.0 | 30 + 1 | 37.16 | | 0.70 | 10.50 | 0.40 |
| 400.0 | | 32.5 | 0.073 | 0.40 | 14.0 | 0.30 |
| 425.0 | 30 + 1 | 43.2 | 0.074 | 0.70 | 8.75 | 0.40 |
| 430.0 | 30 + 1 | 49.5 | 0.073 | 0.70 | 9.00 | 0.40 |
| 430.5 | 30 + 1 | 48.8 | | 0.70 | 9.00 | 0.40 |
| 435.0 | 30 + 1 | 43.3 | 0.070 | 0.70 | 9.00 | 0.40 |
| 435.5 | 30 + 1 | 43.5 | | 0.70 | 9.00 | 0.40 |
| 440.0 | 30 + 1 | 42.3 | 0.084 | 0.70 | 9.25 | 0.40 |
| 441.0 | 30 + 1 | 42.3 | | 0.70 | 9.25 | 0.40 |
| 442.0 | 30 + 1 | 42.3 | | 0.70 | 9.25 | 0.40 |
| 443.0 | 30 + 1 | 43.2 | 0.072 | 0.70 | 9.50 | 0.40 |
| 444.0 | 30 + 1 | 43.5 | | 0.70 | 9.50 | 0.40 |
| operation with PP&R after 30 min of Service run. | | | | | | |
| 445.0 | 30 + 1 | 43.2 | 0.074 | 0.70 | 9.50 | 0.40 |
| 446.0 | 30 + 1 | 65.0 | | 0.70 | 9.00 | 0.40 |

| Time Total hr | Service Time/Rest Time Min | Product Flux lmh | Product Turbidity NTU | Feed Flow m3/hr | Feed Pressure Psi | Feed Air Flow m3/hr |
| --- | --- | --- | --- | --- | --- | --- |
| 447.0 | 30 + 1 | 63.2 | | 0.70 | 9.00 | 0.40 |
| 448.0 | 30 + 1 | 61.6 | | 0.70 | 9.00 | 0.40 |
| 449.0 | 30 + 1 | 62.8 | 0.079 | 0.70 | 10.00 | 0.40 |
| 450.0 | 30 + 1 | 64.2 | 0.076 | 0.70 | 10.00 | 0.40 |
| 451.0 | 30 + 1 | 63.1 | | 0.70 | 10.00 | 0.40 |
| 452.0 | 30 + 1 | 63.5 | 0.074 | 0.70 | 10.00 | 0.40 |
| 453.0 | 30 + 1 | 63.2 | | 0.70 | 10.00 | 0.40 |
| 454.0 | 30 + 1 | 62.3 | 0.071 | 0.70 | 10.00 | 0.40 |
| 455.0 | 30 + 1 | 60.9 | | 0.70 | 10.00 | 0.40 |
| 456.0 | 30 + 1 | 60.0 | | 0.70 | 10.00 | 0.40 |
| 457.0 | 30 + 1 | 59.1 | | 0.70 | 10.00 | 0.40 |
| 458.0 | 30 + 1 | 58.4 | | 0.70 | 10.25 | 0.40 |
| 459.0 | 30 + 1 | 57.5 | 0.072 | 0.70 | 10.25 | 0.40 |
| 460.0 | 30 + 1 | 56.1 | | 0.70 | 10.25 | 0.40 |
| 470.0 | 30 + 1 | 73.9 | | 0.70 | 9.50 | 0.40 |
| 480.0 | 30 + 1 | 56.3 | 0.072 | 0.70 | 10.00 | 0.40 |
| 490.0 | 30 + 1 | 52.7 | 0.071 | 0.70 | 10.00 | 0.40 |
| 500.0 | 30 + 1 | 64.5 | | 0.70 | 9.0 | 0.40 |
| 525.0 | 30 + 1 | 64.5 | | 0.70 | 8.0 | 0.40 |
| 550.0 | 30 + 1 | 77.8 | 0.073 | 0.70 | 7.0 | 0.40 |
| 575.0 | 30 + 1 | 67.8 | 0.076 | 0.70 | 7.00 | 0.40 |
| 580.0 | 30 + 1 | 61.1 | | 0.70 | 7.00 | 0.40 |
| 582.0 | 30 + 1 | 56.8 | | 0.70 | 7.00 | 0.40 |
| 582.5 | 30 + 1 | 54.9 | | 0.70 | 7.00 | 0.40 |
| 583.0 | 30 + 1 | 51.8 | 0.070 | 0.70 | 7.00 | 0.40 |

Operation at constant flux at 47 lmh and PP&S after 30 min of service run and mild cleaning of Hypo when Prod. Pressure Decreases to 0.25 psi.

| Time Total hr | Service Time/Rest Time Min | Product Flux lmh | Product Turbidity NTU | Feed Flow m3/hr | Feed Pressure Psi | Feed Air Flow m3/hr |
| --- | --- | --- | --- | --- | --- | --- |
| 584.0 | 30 + 1 | 46.6 | | 0.70 | 7.50 | 0.40 |
| 585.0 | 30 + 1 | 46.6 | | 0.70 | 7.50 | 0.40 |
| 586.0 | 30 + 1 | 46.6 | 0.090 | 0.70 | 7.50 | 0.40 |
| 587.0 | 30 + 1 | 46.6 | | 0.70 | 7.50 | 0.40 |
| 588.0 | 30 + 1 | 46.6 | | 0.70 | 7.50 | 0.40 |
| 589.0 | 30 + 1 | 47.7 | | 0.70 | 8.75 | 0.40 |
| 590.0 | 30 + 1 | 47.7 | 0.075 | 0.70 | 8.00 | 0.40 |
| 595.0 | 30 + 1 | 46.6 | 0.092 | 0.70 | 7.75 | 0.40 |
| 600.0 | 30 + 1 | 47.7 | | 0.70 | 7.50 | 0.40 |
| 610.0 | 30 + 1 | 47.7 | | 0.70 | 7.50 | 0.40 |
| 620.0 | 30 + 1 | 47.7 | | 0.70 | 7.50 | 0.40 |
| 630.0 | 30 + 1 | 46.6 | | 0.70 | 7.75 | 0.40 |
| 640.0 | 30 + 1 | 47.7 | | 0.70 | 7.50 | 0.40 |
| 650.0 | 30 + 1 | 46.6 | | 0.70 | 8.50 | 0.40 |
| 675.0 | 30 + 1 | 47.7 | 0.076 | 0.70 | 8.00 | 0.40 |
| 700.0 | 30 + 1 | 39.8 | | 0.70 | 7.50 | 0.40 |
| 701.0 | 30 + 1 | 39.8 | 0.071 | 0.70 | 7.50 | 0.40 |
| 702.0 | 30 + 1 | 39.8 | | 0.70 | 7.50 | 0.40 |
| 703.0 | 30 + 1 | 39.8 | 0.072 | 0.70 | 7.50 | 0.40 |

Operation with constant flux at 40 lmh and back diffusion after 30 min of service run Hypo cleaning when Prod Pressure Decreases to 0.25 psi.

| Time Total hr | Service Time/Rest Time Min | Product Flux lmh | Product Turbidity NTU | Feed Flow m3/hr | Feed Pressure Psi | Feed Air Flow m3/hr |
| --- | --- | --- | --- | --- | --- | --- |
| 704.0 | 30 + 1 | 43.2 | 0.067 | 0.50 | 7.75 | 0.30 |
| 705.0 | 30 + 1 | 42.0 | | 0.50 | 7.75 | 0.30 |
| 706.0 | 30 + 1 | 40.9 | | 0.50 | 7.75 | 0.30 |
| 707.0 | 30 + 1 | 40.9 | | 0.50 | 7.75 | 0.30 |
| 708.0 | 30 + 1 | 40.9 | | 0.50 | 7.75 | 0.30 |
| 709.0 | 30 + 1 | 40.9 | | 0.50 | 7.75 | 0.30 |
| 710.0 | 30 + 1 | 40.9 | 0.069 | 0.50 | 7.75 | 0.30 |
| 715.0 | 30 + 1 | 40.9 | | 0.50 | 7.75 | 0.30 |
| 720.0 | 30 + 1 | 40.9 | 0.07 | 0.50 | 8.00 | 0.30 |
| 725.0 | 30 + 1 | 40.9 | | 0.50 | 7.75 | 0.30 |
| 750.0 | 30 + 1 | 40.9 | | 0.50 | 7.75 | 0.30 |
| 775.0 | 30 + 1 | 39.8 | 0.069 | 0.50 | 8.00 | 0.30 |
| 800.0 | 30 + 1 | 40.9 | | 0.50 | 7.75 | 0.30 |
| 825.0 | 30 + 1 | 40.9 | | 0.50 | 7.75 | 0.30 |
| 850.0 | 30 + 1 | 40.9 | 0.072 | 0.50 | 7.50 | 0.30 |
| 875.0 | 30 + 1 | 40.9 | | 0.50 | 7.75 | 0.30 |
| 900.0 | 30 + 1 | 40.9 | | 0.50 | 9.50 | 0.30 |
| 930.0 | 30 + 1 | 39.8 | | 0.50 | 9.50 | 0.30 |
| 931.0 | 30 + 1 | 39.8 | | 0.50 | 9.50 | 0.30 |

Operation at Constant flux of 40 lmh. PP&R after 15 min of service cycle

| Time Total hr | Service Time/Rest Time Min | Product Flux lmh | Product Turbidity NTU | Feed Flow m3/hr | Feed Pressure Psi | Feed Air Flow m3/hr |
| --- | --- | --- | --- | --- | --- | --- |
| 931.50 | 15 + 1 | 40.9 | | 0.50 | 9.00 | 0.30 |
| 932.00 | 15 + 1 | 40.9 | 0.081 | 0.50 | 9.00 | 0.30 |
| 933.00 | 15 + 1 | 40.9 | | 0.50 | 9.00 | 0.30 |
| 934.00 | 15 + 1 | 40.9 | | 0.50 | 9.00 | 0.30 |
| 935.00 | 15 + 1 | 40.9 | | 0.50 | 9.50 | 0.30 |
| 936.00 | 15 + 1 | 40.9 | 0.102 | 0.50 | 9.50 | 0.30 |
| 937.00 | 15 + 1 | 40.9 | | 0.50 | 9.50 | 0.30 |
| 938.00 | 15 + 1 | 40.9 | | 0.50 | 9.50 | 0.30 |
| 939.00 | 15 + 1 | 40.9 | 0.104 | 0.50 | 9.50 | 0.30 |
| 940.00 | 15 + 1 | 40.9 | | 0.50 | 9.50 | 0.30 |
| 945.00 | 15 + 1 | 40.9 | | 0.50 | 9.75 | 0.30 |
| 950.50 | 15 + 1 | 40.9 | | 0.50 | 9.50 | 0.30 |
| 955.00 | 15 + 1 | 40.9 | 0.067 | 0.50 | 9.50 | 0.30 |
| 960.00 | 15 + 1 | 40.9 | | 0.50 | 9.50 | 0.30 |
| 965.00 | 15 + 1 | 40.9 | | 0.50 | 9.50 | 0.30 |
| 970.25 | 15 + 1 | 40.9 | 0.061 | 0.50 | 9.50 | 0.30 |
| 980.25 | 15 + 1 | 40.9 | | 0.50 | 9.50 | 0.30 |
| 990.25 | 15 + 1 | 40.9 | 0.071 | 0.50 | 9.50 | 0.30 |
| 1000.25 | 15 + 1 | 40.9 | | 0.50 | 9.50 | 0.30 |
| 1050.25 | 15 + 1 | 40.9 | 0.070 | 0.50 | 9.50 | 0.30 |
| 1075.25 | 15 + 1 | 40.9 | 0.075 | 0.50 | 9.50 | 0.30 |
| 1100.25 | 15 + 1 | 40.9 | | 0.50 | 10.0 | 0.30 |
| 1150.25 | 15 + 1 | 40.9 | | 0.50 | 10.0 | 0.30 |
| 1175.25 | 15 + 1 | 40.9 | 0.07 | 0.50 | 10.0 | 0.30 |
| 1200.25 | 15 + 1 | 40.9 | 0.071 | 0.50 | 10.0 | 0.30 |
| 1205.25 | 15 + 1 | 40.9 | 0.074 | 0.50 | 10.0 | 0.30 |
| 1210.25 | 15 + 1 | 40.9 | | 0.50 | 10.0 | 0.30 |
| 1215.25 | 15 + 1 | 40.9 | 0.087 | 0.50 | 10.0 | 0.30 |
| 1218.25 | 15 + 1 | 40.9 | | 0.50 | 10.0 | 0.30 |
| 1219.25 | 15 + 1 | 40.9 | | 0.50 | 10.0 | 0.30 |
| 1220.25 | 15 + 1 | 40.9 | 0.082 | 0.50 | 10.0 | 0.30 |

| Time Total hr | Service Time/Rest Time Min | Product Flux lmh | Product Turbidity NTU | Feed Flow m3/hr | Feed Pressure Psi | Feed Air Flow m3/hr |
| --- | --- | --- | --- | --- | --- | --- |
| 0.5 | 10 + 1 | 53.4 | 0.075 | 0.70 | 7.0 | 0.40 |
| 1.0 | 10 + 1 | 53.1 | | 0.70 | 7.0 | 0.40 |
| 5.0 | 10 + 1 | 52.5 | | 0.70 | 7.0 | 0.40 |
| 5.5 | 10 + 1 | 54.8 | | 0.70 | 7.0 | 0.40 |
| 6.0 | 10 + 1 | 54.2 | 0.074 | 0.70 | 7.0 | 0.40 |
| 7.0 | 10 + 1 | 53.5 | 0.071 | 0.70 | 7.0 | 0.40 |
| 8.0 | 10 + 1 | 52.5 | 0.070 | 0.70 | 7.0 | 0.40 |
| 9.0 | 10 + 1 | 50.9 | 0.071 | 0.70 | 7.0 | 0.40 |
| 10.0 | 10 + 1 | 50.6 | 0.073 | 0.70 | 7.0 | 0.40 |
| 11.0 | 10 + 1 | 49.3 | 0.072 | 0.70 | 7.0 | 0.40 |
| 12.0 | 10 + 1 | 48.9 | 0.068 | 0.70 | 7.0 | 0.40 |
| 13.0 | 10 + 1 | 48.2 | 0.070 | 0.70 | 7.0 | 0.40 |
| 14.0 | 10 + 1 | 47.0 | 0.072 | 0.70 | 7.0 | 0.40 |
| 15.0 | 10 + 1 | 46.6 | 0.076 | 0.70 | 7.0 | 0.40 |
| 16.0 | 10 + 1 | 45.7 | 0.080 | 0.70 | 7.0 | 0.40 |
| 17.0 | 10 + 1 | 44.7 | 0.073 | 0.70 | 7.0 | 0.40 |
| 18.0 | 10 + 1 | 43.9 | | 0.70 | 7.0 | 0.40 |
| 19.0 | 10 + 1 | 42.2 | 0.078 | 0.70 | 7.0 | 0.40 |
| 20.0 | 10 + 1 | 42.0 | 0.063 | 0.70 | 7.0 | 0.40 |
| 25.0 | 10 + 1 | 55.7 | | 0.70 | 7.0 | 0.40 |
| 30.0 | 10 + 1 | 52.8 | | 0.70 | 7.0 | 0.40 |
| 35.0 | 10 + 1 | 47.0 | 0.076 | 0.70 | 7.0 | 0.40 |
| 40.0 | 10 + 1 | 41.3 | | 0.70 | 7.0 | 0.40 |
| 45.0 | 10 + 1 | 40.1 | 0.068 | 0.70 | 7.0 | 0.40 |
| 55.0 | 10 + 1 | 39.4 | 0.071 | 0.70 | 7.0 | 0.40 |
| 60.0 | 10 + 1 | 40.5 | 0.074 | 0.70 | 7.0 | 0.40 |
| 65.0 | 10 + 1 | 40.2 | 0.072 | 0.70 | 7.0 | 0.40 |
| 70.0 | 10 + 1 | 51.0 | 0.074 | 0.70 | 7.5 | 0.40 |
| 75.0 | 10 + 1 | 50.2 | | 0.70 | 8.0 | 0.40 |
| 80.0 | 10 + 1 | 50.7 | 0.069 | 0.70 | 8.0 | 0.40 |
| 85.0 | 10 + 1 | 51.1 | | 0.70 | 8.0 | 0.40 |
| 90.0 | 10 + 1 | 51.6 | 0.073 | 0.70 | 8.0 | 0.40 |
| 90.5 | 10 + 1 | 56.3 | 0.075 | 0.70 | 8.0 | 0.40 |

-continued

| Time | Service Time/ Rest | Product | | Feed | | Feed Air |
|---|---|---|---|---|---|---|
| Total hr | Time Min | Flux lmh | Turbidity NTU | Flow m3/hr | Pressure Psi | Flow m3/hr |
| 95.0 | 10 + 1 | 54.3 | | 0.70 | 8.0 | 0.40 |
| 100.0 | 10 + 1 | 51.6 | 0.071 | 0.70 | 8.0 | 0.40 |
| 110.0 | 20 + 1 | 52.3 | | 0.70 | 8.0 | 0.40 |
| 120.0 | 30 + 1 | 55.3 | | 0.70 | 8.0 | 0.40 |
| 130.0 | 30 + 1 | 51.9 | 0.075 | 0.70 | 8.0 | 0.40 |
| 140.0 | 30 + 1 | 57.9 | | 0.70 | 8.5 | 0.40 |
| 150.0 | 30 + 1 | 55.7 | | 0.70 | 8.5 | 0.40 |
| 160.0 | 30 + 1 | 51.59 | | 0.70 | 9.5 | 0.40 |
| 170.0 | 30 + 1 | 54.32 | | 0.70 | 9.5 | 0.40 |
| 180.0 | 30 + 1 | 52.84 | | 0.70 | 9.5 | 0.40 |
| 190.0 | 30 + 1 | 48.18 | | 0.70 | 9.5 | 0.40 |
| 200.0 | 30 + 1 | 60.00 | 0.075 | 0.70 | 9.5 | 0.40 |
| 210.0 | 30 + 1 | 57.27 | | 0.70 | 9.5 | 0.40 |
| 220.0 | 30 + 1 | 46.14 | | 0.70 | 10.0 | 0.40 |
| 230.0 | 30 + 1 | 49.89 | 0.069 | 0.70 | 10.0 | 0.40 |
| 240.0 | 30 + 1 | 42.61 | 0.07 | 0.70 | 10.5 | 0.40 |
| 250.0 | 30 + 1 | 35.91 | | 0.50 | 9.0 | 0.20 |
| 260.0 | 30 + 1 | 37.50 | | 0.50 | 9.0 | 0.20 |
| 270.0 | 30 + 1 | 44.32 | 0.069 | 0.70 | 12.0 | 0.40 |
| 280.0 | 30 + 1 | 32.39 | | 0.70 | 12.5 | 0.40 |
| 290.0 | 30 + 1 | 35.57 | | 0.50 | 11.0 | 0.20 |
| 300.0 | 30 + 1 | 27.05 | | 0.50 | 11.0 | 0.20 |
| 310.0 | 30 + 1 | 32.16 | | 0.70 | 12.0 | 0.40 |
| 325.0 | 30 + 1 | 40.68 | | 0.70 | 11.0 | 0.40 |
| 350.0 | 30 + 1 | 39.55 | | 0.70 | 10.25 | 0.40 |
| 375.0 | 30 + 1 | 37.16 | | 0.70 | 10.50 | 0.40 |
| 400.0 | | 32.5 | 0.073 | 0.40 | 14.0 | 0.30 |
| 425.0 | 30 + 1 | 43.2 | 0.074 | 0.70 | 8.75 | 0.40 |
| 430.0 | 30 + 1 | 49.5 | 0.073 | 0.70 | 9.00 | 0.40 |
| 430.5 | 30 + 1 | 48.8 | | 0.70 | 9.00 | 0.40 |
| 435.0 | 30 + 1 | 43.3 | 0.070 | 0.70 | 9.00 | 0.40 |
| 435.5 | 30 + 1 | 43.5 | | 0.70 | 9.00 | 0.40 |
| 440.0 | 30 + 1 | 42.3 | 0.084 | 0.70 | 9.25 | 0.40 |
| 441.0 | 30 + 1 | 42.3 | | 0.70 | 9.25 | 0.40 |
| 442.0 | 30 + 1 | 42.3 | | 0.70 | 9.25 | 0.40 |
| 443.0 | 30 + 1 | 43.2 | 0.072 | 0.70 | 9.50 | 0.40 |
| 444.0 | 30 + 1 | 43.5 | | 0.70 | 9.50 | 0.40 |
| operation with Back diffusion after 30 min of Service run. | | | | | | |
| 445.0 | 30 + 1 | 43.2 | 0.074 | 0.70 | 9.50 | 0.40 |
| 446.0 | 30 + 1 | 65.0 | | 0.70 | 9.00 | 0.40 |
| 447.0 | 30 + 1 | 63.2 | | 0.70 | 9.00 | 0.40 |
| 448.0 | 30 + 1 | 61.6 | | 0.70 | 9.00 | 0.40 |
| 449.0 | 30 + 1 | 62.8 | 0.079 | 0.70 | 10.00 | 0.40 |
| 450.0 | 30 + 1 | 64.2 | 0.076 | 0.70 | 10.00 | 0.40 |
| 451.0 | 30 + 1 | 63.1 | | 0.70 | 10.00 | 0.40 |
| 452.0 | 30 + 1 | 63.5 | 0.074 | 0.70 | 10.00 | 0.40 |
| 453.0 | 30 + 1 | 63.2 | | 0.70 | 10.00 | 0.40 |
| 454.0 | 30 + 1 | 62.3 | 0.071 | 0.70 | 10.00 | 0.40 |
| 455.0 | 30 + 1 | 60.9 | | 0.70 | 10.00 | 0.40 |
| 456.0 | 30 + 1 | 60.0 | | 0.70 | 10.00 | 0.40 |
| 457.0 | 30 + 1 | 59.1 | | 0.70 | 10.00 | 0.40 |
| 458.0 | 30 + 1 | 58.4 | | 0.70 | 10.25 | 0.40 |
| 459.0 | 30 + 1 | 57.5 | 0.072 | 0.70 | 10.25 | 0.40 |
| 460.0 | 30 + 1 | 56.1 | | 0.70 | 10.25 | 0.40 |
| 470.0 | 30 + 1 | 73.9 | | 0.70 | 9.50 | 0.40 |
| 480.0 | 30 + 1 | 56.3 | 0.072 | 0.70 | 10.00 | 0.40 |
| 490.0 | 30 + 1 | 52.7 | 0.071 | 0.70 | 10.00 | 0.40 |
| 500.0 | 30 + 1 | 64.5 | | 0.70 | 9.0 | 0.40 |
| 525.0 | 30 + 1 | 64.5 | | 0.70 | 8.0 | 0.40 |
| 550.0 | 30 + 1 | 77.8 | 0.073 | 0.70 | 7.00 | 0.40 |
| 575.0 | 30 + 1 | 67.8 | 0.076 | 0.70 | 7.00 | 0.40 |
| 580.0 | 30 + 1 | 61.1 | | 0.70 | 7.00 | 0.40 |
| 582.0 | 30 + 1 | 56.8 | | 0.70 | 7.00 | 0.40 |
| 582.5 | 30 + 1 | 54.9 | | 0.70 | 7.00 | 0.40 |
| 583.0 | 30 + 1 | 51.8 | 0.070 | 0.70 | 7.00 | 0.40 |
| Operation at constant flux at 47 lmh with PP&S after 30 min of service run and mild cleaning of NaOCl when product pressure decreases to 0.25 psi | | | | | | |
| 584.0 | 30 + 1 | 46.6 | | 0.70 | 7.50 | 0.40 |
| 585.0 | 30 + 1 | 46.6 | | 0.70 | 7.50 | 0.40 |
| 586.0 | 30 + 1 | 46.6 | 0.090 | 0.70 | 7.50 | 0.40 |
| 587.0 | 30 + 1 | 46.6 | | 0.70 | 7.50 | 0.40 |
| 588.0 | 30 + 1 | 46.6 | | 0.70 | 7.50 | 0.40 |
| 589.0 | 30 + 1 | 47.7 | | 0.70 | 8.75 | 0.40 |
| 590.0 | 30 + 1 | 47.7 | 0.075 | 0.70 | 8.00 | 0.40 |
| 595.0 | 30 + 1 | 46.6 | 0.092 | 0.70 | 7.75 | 0.40 |
| 600.0 | 30 + 1 | 47.7 | | 0.70 | 7.50 | 0.40 |
| 610.0 | 30 + 1 | 47.7 | | 0.70 | 7.50 | 0.40 |
| 620.0 | 30 + 1 | 47.7 | | 0.70 | 7.50 | 0.40 |
| 630.0 | 30 + 1 | 46.6 | | 0.70 | 7.75 | 0.40 |
| 640.0 | 30 + 1 | 47.7 | | 0.70 | 7.50 | 0.40 |
| 650.0 | 30 + 1 | 46.6 | | 0.70 | 8.50 | 0.40 |
| 675.0 | 30 + 1 | 47.7 | 0.076 | 0.70 | 8.00 | 0.40 |
| 700.0 | 30 + 1 | 39.8 | | 0.70 | 7.50 | 0.40 |
| 701.0 | 30 + 1 | 39.8 | 0.071 | 0.70 | 7.50 | 0.40 |
| 702.0 | 30 + 1 | 39.8 | | 0.70 | 7.50 | 0.40 |
| 703.0 | 30 + 1 | 39.8 | 0.072 | 0.70 | 7.50 | 0.40 |
| Operation with constant flux at 40 lmh and PP&S after 30 min of service run Hypo cleaning when product pressure decreases to 0.25 psi | | | | | | |
| 704.0 | 30 + 1 | 43.2 | 0.067 | 0.50 | 7.75 | 0.30 |
| 705.0 | 30 + 1 | 42.0 | | 0.50 | 7.75 | 0.30 |
| 706.0 | 30 + 1 | 40.9 | | 0.50 | 7.75 | 0.30 |
| 707.0 | 30 + 1 | 40.9 | | 0.50 | 7.75 | 0.30 |
| 708.0 | 30 + 1 | 40.9 | | 0.50 | 7.75 | 0.30 |
| 709.0 | 30 + 1 | 40.9 | | 0.50 | 7.75 | 0.30 |
| 710.0 | 30 + 1 | 40.9 | 0.069 | 0.50 | 7.75 | 0.30 |
| 715.0 | 30 + 1 | 40.9 | | 0.50 | 7.75 | 0.30 |
| 720.0 | 30 + 1 | 40.9 | 0.07 | 0.50 | 8.00 | 0.30 |
| 725.0 | 30 + 1 | 40.9 | | 0.50 | 7.75 | 0.30 |
| 750.0 | 30 + 1 | 40.9 | | 0.50 | 7.75 | 0.30 |
| 775.0 | 30 + 1 | 39.8 | 0.069 | 0.50 | 8.00 | 0.30 |
| 800.0 | 30 + 1 | 40.9 | | 0.50 | 7.75 | 0.30 |
| 825.0 | 30 + 1 | 40.9 | | 0.50 | 7.75 | 0.30 |
| 850.0 | 30 + 1 | 40.9 | 0.072 | 0.50 | 7.50 | 0.30 |
| 875.0 | 30 + 1 | 40.9 | | 0.50 | 7.75 | 0.30 |
| 900.0 | 30 + 1 | 40.9 | | 0.50 | 9.50 | 0.30 |
| 930.0 | 30 + 1 | 39.8 | | 0.50 | 9.50 | 0.30 |
| 931.0 | 30 + 1 | 39.8 | | 0.50 | 9.50 | 0.30 |
| Operation at Constant flux of 40 lmh. PP&S after 15 min of service cycle | | | | | | |
| 931.50 | 15 + 1 | 40.9 | | 0.50 | 9.00 | 0.30 |
| 932.00 | 15 + 1 | 40.9 | 0.081 | 0.50 | 9.00 | 0.30 |
| 933.00 | 15 + 1 | 40.9 | | 0.50 | 9.00 | 0.30 |
| 934.00 | 15 + 1 | 40.9 | | 0.50 | 9.00 | 0.30 |
| 935.00 | 15 + 1 | 40.9 | | 0.50 | 9.50 | 0.30 |
| 936.00 | 15 + 1 | 40.9 | 0.102 | 0.50 | 9.50 | 0.30 |
| 937.00 | 15 + 1 | 40.9 | | 0.50 | 9.50 | 0.30 |
| 938.00 | 15 + 1 | 40.9 | | 0.50 | 9.50 | 0.30 |
| 939.00 | 15 + 1 | 40.9 | 0.104 | 0.50 | 9.50 | 0.30 |
| 940.00 | 15 + 1 | 40.9 | | 0.50 | 9.50 | 0.30 |
| 945.00 | 15 + 1 | 40.9 | | 0.50 | 9.75 | 0.30 |
| 950.50 | 15 + 1 | 40.9 | | 0.50 | 9.50 | 0.30 |
| 955.00 | 15 + 1 | 40.9 | 0.067 | 0.50 | 9.50 | 0.30 |
| 960.00 | 15 + 1 | 40.9 | | 0.50 | 9.50 | 0.30 |
| 965.00 | 15 + 1 | 40.9 | | 0.50 | 9.50 | 0.30 |
| 970.25 | 15 + 1 | 40.9 | 0.061 | 0.50 | 9.50 | 0.30 |
| 980.25 | 15 + 1 | 40.9 | | 0.50 | 9.50 | 0.30 |
| 990.25 | 15 + 1 | 40.9 | 0.071 | 0.50 | 9.50 | 0.30 |
| 1000.25 | 15 + 1 | 40.9 | | 0.50 | 9.50 | 0.30 |
| 1050.25 | 15 + 1 | 40.9 | 0.070 | 0.50 | 9.50 | 0.30 |
| 1075.25 | 15 + 1 | 40.9 | 0.075 | 0.50 | 9.50 | 0.30 |
| 1100.25 | 15 + 1 | 40.9 | | 0.50 | 10.0 | 0.30 |
| 1150.25 | 15 + 1 | 40.9 | | 0.50 | 10.0 | 0.30 |
| 1175.25 | 15 + 1 | 40.9 | 0.07 | 0.50 | 10.0 | 0.30 |
| 1200.25 | 15 + 1 | 40.9 | 0.071 | 0.50 | 10.0 | 0.30 |
| 1205.25 | 15 + 1 | 40.9 | 0.074 | 0.50 | 10.0 | 0.30 |
| 1210.25 | 15 + 1 | 40.9 | | 0.50 | 10.0 | 0.30 |
| 1215.25 | 15 + 1 | 40.9 | 0.087 | 0.50 | 10.0 | 0.30 |
| 1218.25 | 15 + 1 | 40.9 | | 0.50 | 10.0 | 0.30 |
| 1219.25 | 15 + 1 | 40.9 | | 0.50 | 10.0 | 0.30 |
| 1220.25 | 15 + 1 | 40.9 | 0.082 | 0.50 | 10.0 | 0.30 |

TABLE C (Detailed log sheet of Data Example-4)

|  |  | Product | | | Recirln | Module Air | | | |
|---|---|---|---|---|---|---|---|---|---|
|  |  |  |  |  |  | Actual | | | |
| Time | Service Time | Flow (lph) | Flux (lmh) | Turbidity (NTU) | Flow (m3/h) | Flow (m3/h) | Pressure (psi) | Pressure (psi) | Velocity (m/s) |
| 1.00 | 5 + 0.5 | 16.20 | 19.85 |  | 0.2 | 0.55 | 2.5 | 0.17 | 0.028 |
| 2.00 | 5 + 0.5 | 16.20 | 19.85 |  | 0.2 | 0.55 | 2.5 | 0.17 | 0.028 |
| 3.00 | 5 + 0.5 | 16.20 | 19.85 |  | 0.2 | 0.55 | 2.5 | 0.17 | 0.028 |
| 4.00 | 5 + 0.5 | 16.20 | 19.85 |  | 0.2 | 0.55 | 2.5 | 0.17 | 0.028 |
| 5.00 | 5 + 0.5 | 16.20 | 19.85 |  | 0.2 | 0.40 | 1.8 | 0.12 | 0.025 |
| 6.00 | 5 + 0.5 | 16.20 | 19.85 | 0.088 | 0.2 | 0.40 | 1.8 | 0.12 | 0.025 |
| 7.00 | 5 + 0.5 | 16.56 | 20.29 | 0.084 | 0.2 | 0.40 | 1.8 | 0.12 | 0.025 |
| 8.00 | 5 + 0.5 | 16.56 | 20.29 |  | 0.2 | 0.40 | 1.8 | 0.12 | 0.025 |
| 9.00 | 5 + 0.5 | 16.56 | 20.29 | 0.089 | 0.2 | 0.40 | 2.0 | 0.14 | 0.025 |
| 10.00 | 5 + 0.5 | 16.56 | 20.29 |  | 0.2 | 0.40 | 2.0 | 0.14 | 0.025 |
| 11.00 | 5 + 0.5 | 16.56 | 20.29 |  | 0.2 | 0.40 | 2.0 | 0.14 | 0.025 |
| 12.00 | 5 + 0.5 | 16.56 | 20.29 |  | 0.2 | 0.40 | 2.0 | 0.14 | 0.025 |
| 13.00 | 5 + 0.5 | 16.56 | 20.29 |  | 0.2 | 0.40 | 2.0 | 0.14 | 0.025 |
| 14.00 | 5 + 0.5 | 16.56 | 20.29 |  | 0.2 | 0.40 | 2.0 | 0.14 | 0.025 |
| 15.00 | 5 + 0.5 | 16.56 | 20.29 |  | 0.2 | 0.40 | 2.0 | 0.14 | 0.025 |
| 16.00 | 5 + 0.5 | 16.56 | 20.29 |  | 0.2 | 0.40 | 2.0 | 0.14 | 0.025 |
| 17.00 | 5 + 0.5 | 16.56 | 20.29 | 0.087 | 0.2 | 0.40 | 2.0 | 0.14 | 0.025 |
| 18.00 | 5 + 0.5 | 16.56 | 20.29 |  | 0.2 | 0.40 | 2.0 | 0.14 | 0.025 |
| 19.00 | 5 + 0.5 | 16.56 | 20.29 |  | 0.2 | 0.40 | 2.0 | 0.14 | 0.025 |
| 20.00 | 5 + 0.5 | 16.56 | 20.29 |  | 0.2 | 0.40 | 2.0 | 0.14 | 0.025 |
| 21.00 | 5 + 0.5 | 16.56 | 20.29 |  | 0.2 | 0.40 | 2.0 | 0.14 | 0.025 |
| 22.00 | 5 + 0.5 | 16.56 | 20.29 |  | 0.2 | 0.40 | 2.0 | 0.14 | 0.025 |
| 23.00 | 5 + 0.5 | 16.56 | 20.29 |  | 0.2 | 0.40 | 2.0 | 0.14 | 0.025 |
| 24.00 | 5 + 0.5 | 16.56 | 20.29 |  | 0.2 | 0.40 | 2.0 | 0.14 | 0.025 |
| 25.00 | 5 + 0.5 | 16.56 | 20.29 |  | 0.2 | 0.40 | 2.0 | 0.14 | 0.025 |
| 26.00 | 5 + 0.5 | 16.56 | 20.29 | 0.082 | 0.2 | 0.40 | 2.0 | 0.14 | 0.025 |
| 27.00 | 5 + 0.5 | 16.56 | 20.29 |  | 0.2 | 0.40 | 2.0 | 0.14 | 0.025 |
| 28.00 | 5 + 0.5 | 16.56 | 20.29 |  | 0.2 | 0.40 | 2.0 | 0.14 | 0.025 |
| 29.00 | 5 + 0.5 | 14.40 | 17.65 |  | 0.2 | 0.40 | 2.0 | 0.14 | 0.025 |
| 30.00 | 5 + 0.5 | 15.60 | 19.12 |  | 0.2 | 0.40 | 2.0 | 0.14 | 0.025 |
| 31.00 | 5 + 0.5 | 15.72 | 19.26 |  | 0.2 | 0.40 | 2.0 | 0.14 | 0.025 |
| 32.00 | 5 + 0.5 | 12.60 | 15.44 |  | 0.2 | 0.40 | 2.0 | 0.14 | 0.025 |
| 33.00 | 5 + 0.5 | 12.00 | 14.71 |  | 0.2 | 0.40 | 2.0 | 0.14 | 0.025 |
| 34.00 | 5 + 0.5 | 16.44 | 20.1 |  | 0.2 | 0.40 | 2.3 | 0.15 | 0.025 |
| 35.00 | 5 + 0.5 | 12.00 | 14.7 |  | 0.2 | 0.40 | 2.3 | 0.15 | 0.025 |
| 36.00 | 5 + 0.5 | 11.76 | 14.4 |  | 0.2 | 0.40 | 2.3 | 0.15 | 0.025 |
| 37.00 | 5 + 0.5 | 11.76 | 14.4 |  | 0.2 | 0.40 | 2.3 | 0.15 | 0.025 |
| 38.00 | 5 + 0.5 | 11.52 | 14.1 |  | 0.2 | 0.40 | 2.3 | 0.15 | 0.025 |
| 39.00 | 5 + 0.5 | 11.16 | 13.7 |  | 0.2 | 0.40 | 2.3 | 0.15 | 0.025 |
| 40.00 | 5 + 0.5 | 11.40 | 17.0 |  | 0.2 | 0.40 | 2.3 | 0.15 | 0.016 |
| 41.00 | 5 + 0.5 | 11.98 | 17.8 |  | 0.2 | 0.40 | 2.3 | 0.15 | 0.016 |
| 42.00 | 5 + 0.5 | 10.80 | 16.1 | 0.090 | 0.2 | 0.40 | 2.3 | 0.15 | 0.016 |
| 43.00 | 5 + 0.5 | 14.16 | 21.1 |  | 0.2 | 0.40 | 2.3 | 0.15 | 0.016 |
| 44.00 | 5 + 0.5 | 12.84 | 19.1 |  | 0.2 | 0.40 | 2.3 | 0.15 | 0.016 |
| 45.00 | 5 + 0.5 | 11.52 | 17.1 |  | 0.2 | 0.40 | 2.3 | 0.15 | 0.016 |
| 46.00 | 5 + 0.5 | 11.40 | 17.0 |  | 0.2 | 0.40 | 2.3 | 0.15 | 0.016 |
| 47.00 | 5 + 0.5 | 17.28 | 25.7 |  | 0.2 | 0.40 | 2.0 | 0.14 | 0.016 |
| 48.00 | 5 + 0.5 | 14.76 | 22.0 |  | 0.2 | 0.40 | 2.0 | 0.14 | 0.016 |
| 49.00 | 5 + 0.5 | 13.44 | 20.0 |  | 0.2 | 0.40 | 2.0 | 0.14 | 0.016 |
| 50.00 | 5 + 0.5 | 13.54 | 20.1 |  | 0.2 | 0.40 | 2.0 | 0.14 | 0.016 |
| 51.00 | 5 + 0.5 | 13.76 | 20.5 |  | 0.2 | 0.40 | 2.0 | 0.14 | 0.016 |
| 52.00 | 5 + 0.5 | 15.24 | 22.7 |  | 0.2 | 0.40 | 2.0 | 0.14 | 0.016 |

We claim:

1. A flat film membrane envelope comprising:
   a) an internal base plate, said base plate comprising a permeate port in communication with a flow path, and said base plate having two opposite sides;
   b) on each side of said base plate, a flat membrane parallel to and sealed over the base plate to form a sealed chamber wherein each of said flat membranes has a porous side and a filtering side, wherein the filtering side of each flat membrane faces away from the base plate, wherein the base plate is internal relative to the flat membranes, and wherein the flat film membrane envelope does not include an external frame, and wherein said flat membranes are fixed to the base plate.

2. The flat film membrane envelope of claim 1, wherein said flat membranes are coated with a material selected from the group consisting of polyvinylidenefluoride, polysulphone, polyethersulfone, polyacrylonitrile, cellulose actate and polyamide, and wherein said coating is on the filtering side of the flat membrane.

3. The flat film membrane envelope of claim 1, wherein said base plate is a molded plastic plate.

4. The flat film membrane envelope of claim 1, wherein said flat membranes are welded to said base plate.

5. The flat film membrane envelope of claim 1, wherein said flat membranes are glued to said base plate.

6. The flat film membrane envelope of claim 1, wherein the flat film membrane envelope does not include a spacer outside said flat membranes.

7. The flat film membrane envelope of claim 1, wherein said base plate includes at least one of a cavity, a corrugation, or a spacer to facilitate water flow to the permeate port.

8. The flat film membrane of claim 1, further comprising, on each side of said base plate, an internal side frame affixed to the base plate and between the base plate and the membrane, wherein the membrane is sealed to the side frame.

9. A water filtration cartridge comprising:
a plurality of flat film membrane envelopes of claim 1, each flat film membrane envelope comprising a product port, said flat film membrane envelopes are stacked equidistantly, and each of said product ports are connected to a common outlet.

10. A module for water purification, comprising:
at least one water filtration cartridge of claim 9, said at least one cartridge inserted into a housing, and wherein, said cartridges having a distance to a near wall of the housing that is equal to or less than the distance between adjacent membrane envelopes in each cartridge and that may be zero.

11. A unit for water purification, comprising:
a plurality of modules of claim 10, wherein the number of modules is selected to vary the overall length of the assembly of modules based on process conditions.

12. The water filtration cartridge of claim 9, wherein said membrane envelopes are separated by a distance between 1-8 mm.

13. A water filtration system comprising:
a) a plurality of cartridges of claim 9;
b) a bracket securing said cartridges; and
c) permeate lines that connect the cartridges and draw permeate under the influence of suction;
wherein the system is submerged in an open tank.

14. The water filtration system of claim 13, wherein each cartridge is wrapped with wire mesh having a mesh size to prevent entry of larger than the mesh size.

15. The water filtration system of claim 13, wherein the membrane envelopes in said cartridges are separated by 2-6 mm.

16. A water filtration system comprising a plurality of vertically stacked water filtration cartridges of claim 9, wherein water flows through multiple modules before exiting the water filtration system, result in energy savings when compared to energy use of a water filtration system comprising a plurality of horizontally stacked water filtration cartridges.

* * * * *